(12) United States Patent
De Lorenzo et al.

(10) Patent No.: US 10,117,096 B2
(45) Date of Patent: Oct. 30, 2018

(54) SYSTEMS AND METHODS TO DETERMINE SAFE ZONES AND SAFE ROUTES OF A DEVICE

(71) Applicant: Athentek Innovations, Inc., Palo Alto, CA (US)

(72) Inventors: David S. De Lorenzo, Palo Alto, CA (US); Huanchun Ye, Cupertino, CA (US); Yi-Hsiu Wang, Palo Alto, CA (US); Ivy H. Tseng, Taipei (TW)

(73) Assignee: Athentek Innovations, Inc., Palo Alto, CA (US)

( * ) Notice: Subject to any disclaimer, the term of this patent is extended or adjusted under 35 U.S.C. 154(b) by 173 days.

(21) Appl. No.: 15/388,848

(22) Filed: Dec. 22, 2016

(65) Prior Publication Data

US 2018/0184288 A1 Jun. 28, 2018

(51) Int. Cl.
*H04W 12/06* (2009.01)
*H04W 12/04* (2009.01)
*H04L 29/06* (2006.01)
*H04W 12/10* (2009.01)
*H04W 4/029* (2018.01)

(52) U.S. Cl.
CPC ............ *H04W 12/06* (2013.01); *H04L 63/06* (2013.01); *H04L 63/083* (2013.01); *H04L 63/107* (2013.01); *H04W 4/029* (2018.02); *H04W 12/04* (2013.01); *H04W 12/10* (2013.01)

(58) Field of Classification Search
CPC ..... H04W 12/06; H04W 4/029; H04W 12/04; H04L 63/06; H04L 63/083; H04L 63/107
USPC ........................................................ 713/168
See application file for complete search history.

(56) References Cited

U.S. PATENT DOCUMENTS

| | | | | |
|---|---|---|---|---|
| 9,070,282 B2 * | 6/2015 | Clough | ............... | G06F 19/3418 |
| 9,462,566 B1 * | 10/2016 | Koller | ..................... | H04W 8/18 |
| 2011/0039580 A1 * | 2/2011 | Wigren | ................. | G01S 5/0252 |
| | | | | 455/456.1 |
| 2016/0381558 A1 * | 12/2016 | Caulfield | .............. | H04W 16/14 |
| | | | | 726/1 |

* cited by examiner

*Primary Examiner* — Eleni A Shiferaw
*Assistant Examiner* — Angela R Holmes
(74) *Attorney, Agent, or Firm* — Levine Bagade Han LLP

(57) ABSTRACT

Systems and methods to generate safe zones and safe routes associated with a device are disclosed. These safe zones and safe routes can be used to map complicated location behavior into location behavior scores that can be applied systematically to tracking and authentication applications.

18 Claims, 31 Drawing Sheets

FIG. 4

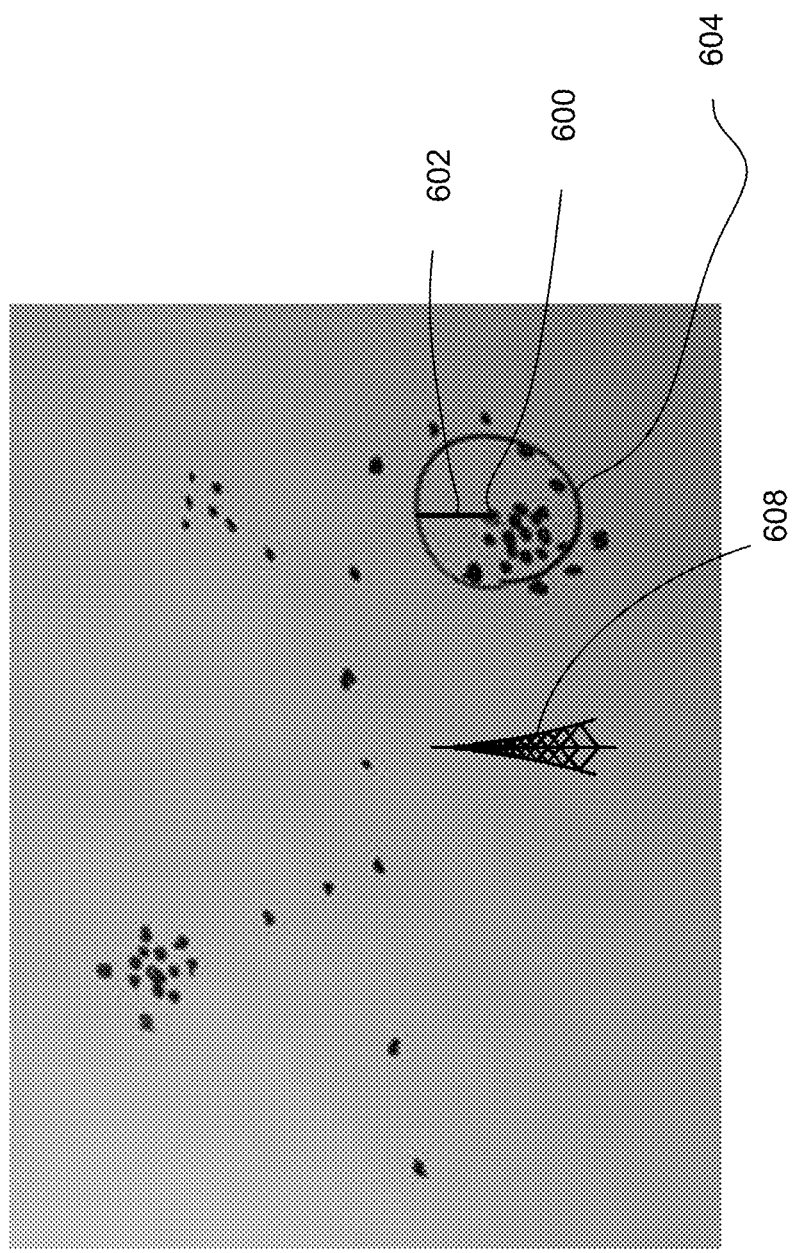

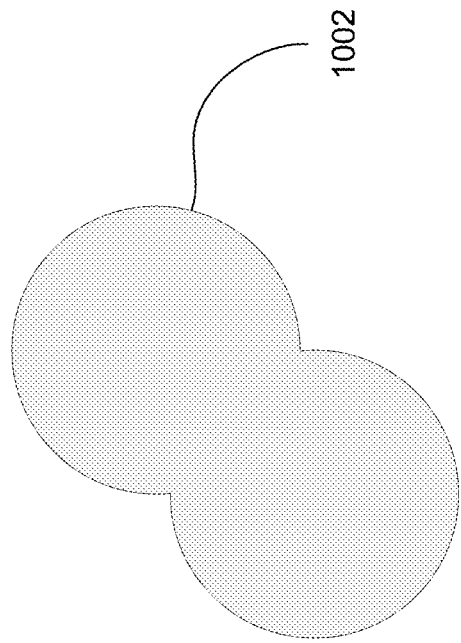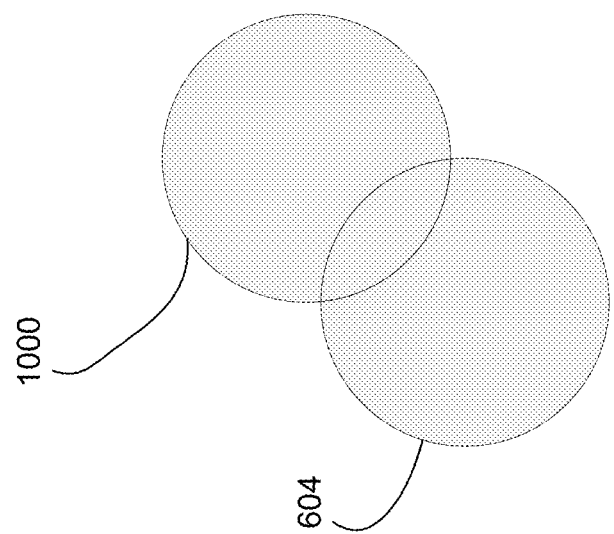
FIG. 10

- Zone 0
  - Hour: [(0, 6), (1, 6), (2, 3), (3, 5), (6, 2), (7, 5), (8, 3), (11, 1), (12, 4), (13, 3), (14, 1), (15, 2), (16, 18), (17, 7), (18, 11), (19, 5), (20, 4), (21, 3), (22, 3), (23, 5)]
  - Week: [(0, 9), (1, 9), (2, 9), (3, 7), (4, 8), (5, 6), (6, 7)]
  - Month: [(1, 2), (2, 2), (3, 2), (4, 2), (5, 1), (6, 2), (7, 2), (8, 2), (9, 2), (10, 2), (11, 2), (12, 2), (13, 2), (14, 2), (15, 2), (16, 2), (17, 2), (18, 2), (19, 1), (20, 1), (21, 2), (22, 2), (23, 2), (24, 2), (25, 1), (26, 2), (27, 1), (28, 2), (29, 2), (30, 1), (31, 1)]
- Zone 1
  - Hour: [(7, 14), (8, 20), (9, 7), (10, 5), (11, 7), (12, 12), (13, 20), (14, 24), (15, 16), (16, 1)]
  - Week: [(0, 7), (1, 8), (2, 8), (3, 7), (4, 5)]
  - Month: [(1, 1), (2, 1), (3, 1), (4, 1), (7, 1), (8, 2), (9, 2), (10, 2), (14, 1), (15, 1), (16, 2), (17, 2), (18, 2), (19, 1), (21, 1), (22, 2), (23, 2), (24, 2), (25, 2), (26, 1), (28, 1), (29, 2), (30, 1), (31, 1)]
- Zone 2
  - Hour: [(17, 1), (18, 1), (19, 1), (20, 1), (21, 1)]
  - Week: [(5, 1)]
  - Month: [(2, 1), (20, 1)]
- Zone 3
  - Hour: [(16, 2), (17, 2), (18, 2)]
  - Week: [(1, 1)]
  - Month: [(5, 1), (23, 1)]
- Zone 4
  - Hour: [(14, 1)]
  - Week: [(3, 1)]
  - Month: [(25, 1)]

SYSTEMS AND METHODS TO DETERMINE SAFE ZONES AND SAFE ROUTES OF A DEVICE

BACKGROUND

1. Field of the Technology

The present disclosure relates generally to the field of determining safe zones and safe routes, and, more specifically, to systems and methods to track a device so as to determine safe zones and safe routes that the device frequents. These safe zones and safe routes are used to map complicated location behavior into location behavior scores that can be applied systematically for many different applications.

2. Related Art

Portable tracking devices that receive their location information through wireless connections are becoming more common. Location information can be obtained from GPS, cellular, Wi-Fi, or other radio frequency location modalities. The portable tracking functionality can be part of portable wireless devices such as smartphones, tablets, smartwatches, fitness monitors as well as dedicated trackers. These devices can be attached to, embedded in, or carried by animate as well as inanimate objects including humans, pets, vehicles, and other physical property.

The location information obtained by tracking devices can be transmitted wirelessly in real or non-real time to servers and systems that can use this information for a variety of purposes including asset tracking, location modeling, marketing, security profiling and authorization, and safety assurance.

Ascertaining the device location and movement is quickly becoming a prerequisite to understanding the behavior of the users of the device. The ability to quickly, frequently, efficiently, and securely obtain and use tracking data from portable tracking devices is important in many different applications. The challenges involved in determining where a device frequents and the routes that the device takes can stem from the sporadic check-in nature of the device. The sporadic check-in data can be due to a variety of factors including limited battery capacity, the device powering down, the device not moving, or lack of wireless coverage. The degree of certainly in a location determination can be an issue and the irregular timing in which location information is sent can pose challenges where timing accuracy is required.

Therefore, solutions are needed for a system and methods to conveniently and effectively track and calculate the zones and routes of a device in a sporadic check-in environment. Such a solution should be robust, relatively low-cost, and provide an accurate representation of the device's movements. Moreover, such a solution should not be overly complex and should be easy to deploy.

SUMMARY

A system to generate a zone of safety associated with a device is disclosed. The system includes a server which can have a processing unit, a memory unit, and a server communication unit. The server communication unit is in communication with the device, and the processing unit can be programmed to receive check-in data from the device. The check-in data can have location data indicating geographic locations frequented by the device and time stamps received by or generated by the device. The system selects a first geographic location from the check-in data as a candidate location and generates a search radius around the candidate location based on contextual criteria. An accumulated dwell-time of the device can be calculated using the check-in data associated with the geographic locations within the search radius. When the accumulated dwell-time exceeds a dwell-time threshold the candidate location can be set as a core point. A safe zone around the core point using the search radius can then be generated.

The processing unit can be further programmed to select a second geographic location from the check-in data. A first time stamp associated with the first geographic location and a second time stamp associated with the second geographic location can be identified. An intermediate geographic location can be generated between the first geographic location and the second geographic location. Then an intermediate time stamp occurring in time between the first time stamp and the second time stamp can be generated. Dwell times associated with the first geographic location, the second geographic location, and the intermediate geographic location can be calculated using the first time stamp, the second time stamp, and the intermediate time stamp.

The processing unit can be further programmed to identify one or more geographic locations from the check-in data within the safe zone and then identify the time stamps associated with the one or more geographic locations from the check-in data. The processing unit can also associate the one or more geographic locations with the safe zone and then calculate the accumulated dwell-time using the time stamps associated with the one or more geographic locations.

The processing unit can be further programmed to merge a further safe zone with the safe zone to form a merged safe zone when the area of the safe zone intersects the area of the further safe zone. The merged safe zone can be a union of the area of the safe zone and the area of the further safe zone.

The processing unit can be further programmed to transmit via the server communication unit an approval request concerning the safe zone to an application device in communication with the server. The processing unit can also calculate a safe zone score based on time-domain patterns of the check-in data. The processing unit can also increase the safe zone score when the approval request transmitted to the application device is approved by the application device.

The processing unit can be further programmed to calculate a safe zone score based on time-domain patterns of the check-in data. The processing unit can also decrease the safe zone score when a last recorded time stamp associated with the safe zone exceeds a maximum time threshold. The processing unit can discard the safe zone from a database accessible to the server when the safe zone score falls below a zone score threshold.

A computer-implemented method to generate a zone of safety associated with a device is also disclosed. The method can involve receiving, using a processing unit of a server, check-in data from the device in communication with the server, where the check-in data can have location data indicating geographic locations frequented by the device and time stamps received by or generated by the device. The processing unit can also select a first geographic location from the check-in data as a candidate location and generate a search radius around the candidate location based on contextual criteria. The processing unit can also calculate an accumulated dwell-time of the device using the check-in data associated with the geographic locations within the search radius. The processing unit can also set the candidate location as a core point when the accumulated dwell-time exceeds a dwell-time threshold and generate a safe zone around the core point using the search radius.

The method can also involve selecting, using the processing unit, a second geographic location from the check-in data. The method can further involve identifying a first time stamp associated with the first geographic location and identifying a second time stamp associated with the second geographic location and generating, using the processing unit, an intermediate geographic location situated between the first geographic location and the second geographic location. The method can further involve generating, using the processing unit, an intermediate time stamp, wherein the intermediate time stamp is occurring in time between the first time stamp and the second time stamp. The processing unit can further calculate dwell times associated with the first geographic location, the second geographic location, and the intermediate geographic location using the first time stamp, the second time stamp, and the intermediate time stamp.

The method can also involve identifying, using the processing unit, one or more geographic locations from the check-in data within the safe zone and the time stamps associated with the one or more geographic locations from the check-in data. The method can further involve associating, using the processing unit, the one or more geographic locations with the safe zone and calculating, using the processing unit, the accumulated dwell-time using the time stamps associated with the one or more geographic locations.

The method can also further involve merging, using the processing unit, a further safe zone with the safe zone to form a merged safe zone when the area of the safe zone intersects the area of the further safe zone. The merged safe zone can be a union of the area of the safe zone with the area of the further safe zone.

The method can also further involve transmitting, using a server communication unit of the server, an approval request concerning the safe zone to an application device in communication with the server. The method can also further involve calculating, using the processing unit, a safe zone score based on time-domain patterns of the check-in data and it can also further involve increasing, using the processing unit, the safe zone score when the approval request is approved by the application device and decreasing, using the processing unit, the safe zone score when a last recorded time stamp associated with the safe zone exceeds a maximum time threshold.

The method can further involve calculating, using the processing unit, a safe zone score based on time-domain patterns of the check-in data and decreasing, using the processing unit, the safe zone score when a last recorded time stamp associated with the safe zone exceeds a maximum time threshold. The method can also further involve discarding, using the processing unit, the safe zone from a database accessible to the server when the safe zone score falls below a zone score threshold.

A system to determine a safe route associated with a device is also disclosed. The system can have a server and the server can have a processing unit, a memory unit, and a server communication unit. The server communication unit can be in communication with the device, and the processing unit can be programmed to receive check-in data from the device, where the check-in data can have location data indicating geographic locations frequented by the device and time stamps received by or generated by the device. The processing unit can also be programmed to establish geographic zones associated with the device, where the geographic zones include a starting zone and a destination zone. The processing unit can also be programmed to identify at least one first intermediate geographic location from the check-in data in connection with a first tracked route taken by the device from the starting zone to the destination zone, where the first intermediate geographic location is not within any of the geographic zones. The processing unit can also be programmed to identify at least one second intermediate geographic location from the check-in data in connection with a second tracked route taken by the device from the starting zone to the destination zone, where the second intermediate geographic location is not within any of the geographic zones. The processing unit can further be programmed to determine a candidate safe route connecting the starting zone, the first intermediate geographic location, the second intermediate geographic location, and the destination zone.

The processing unit can be further programmed to calculate a safe route score based on at least one of time-domain patterns of the check-in data, elapsed time since receiving the check-in data, accident rates in a vicinity of the candidate safe route, and a route traversal count. The processing unit can also be programmed to designate the candidate safe route as an accepted safe route when the safe route score exceeds a score threshold.

The processing unit can be further programmed to adjust the score threshold using a learning algorithm.

The processing unit can be further programmed to transmit via the server communication unit an approval request concerning the candidate safe route to an application device in communication with the server and increase the safe route score when the approval request transmitted to the application device is approved by the application device.

The processing unit can be further programmed to calculate a distribution of dwell times along the accepted safe route and determine a waypoint along the accepted safe route using the distribution of dwell times. The processing unit can also be further programmed to calculate a waypoint score associated with the waypoint and discard the waypoint when the waypoint score falls below a waypoint threshold.

The processing unit can be further programmed to retrieve, from a map database accessible to the server, candidate route segments within the starting zone and the destination zone and retrieve, from the map database accessible to the server, candidate route segments within a first configurable area within a tolerance radius from the first intermediate geographic location and retrieve, from the map database accessible to the server, the candidate route segments within a second configurable area within the tolerance radius from the second intermediate geographic location. The processing unit can also be further programmed to determine a global minimum-cost route connecting the starting zone, the first intermediate geographic location, the second intermediate geographic location, and the destination zone using the candidate route segments and at least one routing algorithm.

The processing unit can be further programmed to calculate a route traversal count using additional check-in data received from the device and discard one or more of the candidate route segments making up the global minimum-cost route when the route traversal count is below a route traversal threshold. The processing unit can be further programmed to connect remaining instances of the candidate route segments making up the global minimum-cost route to determine the candidate safe route.

The processing unit can be programmed to calculate a trip duration of at least one of the first tracked route and the second tracked route using the time stamps. The processing unit can be programmed to discard the first intermediate geographic location from a check-in database when the trip duration of the first tracked route exceeds a maximum duration threshold or discard the second intermediate geographic location from the check-in database when the trip duration of the second tracked route exceeds the maximum duration threshold.

A computer-implemented method to determine a safe route associated with a device is also disclosed. The method can involve receiving, using a processing unit of a server, check-in data from a device in communication with the server, where the check-in data can have location data indicating geographic locations frequented by the device and time stamps received by or generated by the device. The method can also involve establishing, using the processing unit, geographic zones associated with the device, where the geographic zones include a starting zone and a destination zone. The method can also involve identifying, using the processing unit, at least one first intermediate geographic location from the check-in data in connection with a first tracked route taken by the device from the starting zone to the destination zone, where the first intermediate geographic location is not within any of the geographic zones. The method can also involve identifying, using the processing unit, at least one second intermediate geographic location from the check-in data in connection with a second tracked route taken by the device from the starting zone to the destination zone, where the second intermediate geographic location is not within any of the geographic zones. The method can further involve determining a candidate safe route connecting the starting zone, the first intermediate geographic location, the second intermediate geographic location, and the destination zone.

The computer-implemented method can further include calculating, using the processing unit, a safe route score based on at least one of time-domain patterns of the check-in data, elapsed time since receiving the check-in data, accident rates in a vicinity of the candidate safe route, and a route traversal count. The method can also include designating, using the processing unit, the candidate safe route as an accepted safe route when the safe route score exceeds a score threshold.

The computer-implemented method can further include adjusting the score threshold using a learning algorithm.

The computer-implemented method can further include transmitting via the server communication unit an approval request concerning the candidate safe route to an application device in communication with the server. The method can also further include increasing, using the processing unit, the safe route score when the approval request transmitted to the application device is approved by the application device.

The computer-implemented method can further involve calculating, using the processing unit, a distribution of dwell times along the accepted safe route and determining, using the processing unit, a waypoint along the accepted safe route using the distribution of dwell times. The method can also involve calculating, using the processing unit, a waypoint score associated with the waypoint and discarding, using the processing unit, the waypoint when the waypoint score falls below a waypoint threshold.

The computer-implemented method can further involve retrieving, using the processing unit, from a map database accessible to the server, candidate route segments within the starting zone and the destination zone. The method can also further involve retrieving, using the processing unit, from the map database, the candidate route segments within a first configurable area within a tolerance radius from the first intermediate geographic location and retrieving, using the processing unit, from the map database, the candidate route segments within a second configurable area within the tolerance radius from the second intermediate geographic location. The method can also further involve determining, using the processing unit, a global minimum-cost route connecting the starting zone, the first intermediate geographic location, the second geographic location, and the destination zone using the candidate route segments and at least one routing algorithm.

The computer-implemented method can further involve calculating, using the processing unit, a route traversal count using additional check-in data received from the device. The method can also further involve discarding, using the processing unit, one or more of the candidate route segments making up the global minimum-cost route when the route traversal count is below a route traversal threshold. The method can also involve connecting, using the processing unit, remaining instances of the candidate route segments making up the global minimum-cost route to determine the candidate safe route.

The computer-implemented method can further include calculating, using the processing unit, a trip duration of at least one of the first tracked route and the second tracked route using the time stamps. The method can also further include discarding, using the processing unit, the first intermediate geographic location from a check-in database when the trip duration of the first tracked route exceeds a maximum duration threshold or discard the second intermediate geographic location from the check-in database when the trip duration of the second tracked route exceeds the maximum duration threshold.

A system to authenticate a device is also disclosed. The system can have a fixed wireless infrastructure device, where the fixed wireless infrastructure device can have a processor, a memory, and a communication unit, and the processor can be programmed to scan, periodically, using the communication unit, a radio environment surrounding the fixed wireless infrastructure device to obtain a radio signal fingerprint. The system can also have an authentication server which can have a processing unit, a memory unit, and a server communication unit, where the server communication unit can be in communication with the fixed wireless infrastructure device, and the processing unit can be programmed to transmit, periodically, a first cryptographic key to the fixed wireless infrastructure device. The first cryptographic key can be included as part of a wireless broadcast frame of a wireless communication protocol. The processing unit can be programmed to receive from the fixed wireless infrastructure device the radio signal fingerprint to corroborate a geographic location of the fixed wireless infrastructure device. The processor of the fixed wireless infrastructure device can be further programmed to broadcast, via the communication unit, the first cryptographic key. The processing unit of the authentication server can be further programmed to receive a second cryptographic key from an application server originating from the device. The application server can be configured to receive the second cryptographic key as part of a request from the device to access a resource provided by the application server. The processing unit of the authentication server can be programmed to generate a request approval recommendation to allow the device access to the resource provided by the application server when the first cryptographic key matches the second cryptographic key and the radio signal fingerprint matches a preapproved radio fingerprint.

The wireless communication protocol can be at least one of an IEEE 802.11 protocol, a Bluetooth™ protocol, an iBeacon™ protocol, or any combination thereof.

The wireless broadcast frame can be a WiFi broadcast frame, a Bluetooth™ broadcast frame, an iBeacon™ broadcast frame, or any combination thereof.

The processing unit of the authentication server can be further programmed to evaluate location measurement data received from the device by comparing the location measurement data against pre-approved data stored in a location database accessible to the authentication server. The location measurement data can include GPS data, GNSS data, radio signal strength data, or device identification data collected or generated by the device. The processing unit of the authentication server can be programmed to evaluate travel pattern data received from the device by comparing the travel pattern data with historical travel records associated with the device. The processing unit of the authentication server can be programmed to determine a data authenticity score based on the evaluation of the location measurement data and the travel pattern data.

The processing unit of the authentication server can be further programmed to determine a device authenticity score using a change in the data authenticity score over time and time-domain patterns associated with the device.

The processing unit of the authentication server can be further programmed to evaluate dwell times of the device in designated zones. The processing unit of the authentication server can be programmed to evaluate travel frequency of the device using designated routes. The processing unit of the authentication server can be programmed to determine a user authenticity score in connection with a user of the device using the device authenticity score, the evaluation of the dwell times in designated zones and travel frequency using the designated routes.

The processing unit of the authentication server can be further programmed to grant permission to a resource provided by an application server in communication with the authentication server based on a comparison of the user authenticity score and a predetermined risk template.

A computer-implemented method to authenticate a device is also disclosed. The method can involve scanning, periodically, using a communication unit of a fixed wireless infrastructure device a radio environment surrounding the fixed wireless infrastructure device to obtain a radio signal fingerprint. The method can involve transmitting, periodically, a first cryptographic key to the fixed wireless infrastructure device from an authentication server. The authentication server can have a processing unit. The first cryptographic key can be included as part of a wireless broadcast frame of a wireless communication protocol. The method can involve receiving, at the authentication server, the radio signal fingerprint from the fixed wireless infrastructure device to corroborate a geographic location of the fixed wireless infrastructure device. The method can involve transmitting, using the communication unit of the fixed wireless infrastructure device, the first cryptographic key to the device when the device is within the radio environment and unconnected to a wireless network established by the fixed wireless infrastructure device. The method can involve receiving, at the authentication server, a second cryptographic key from an application server originating from the device. The application server can be configured to receive the second cryptographic key as part of a request from the device to access a resource provided by the application server. The method can involve generating at the authentication server, a request approval recommendation to allow the device access to the resource provided by the application server when the first cryptographic key matches the second cryptographic key and the radio signal fingerprint matches a preapproved radio fingerprint.

The wireless communication protocol can be an IEEE 802.11 protocol, a Bluetooth™ protocol, an iBeacon™ protocol, or any combination thereof.

The wireless broadcast frame can be a Wi-Fi broadcast frame, a Bluetooth™ broadcast frame, an iBeacon™ broadcast frame or any combination thereof.

The computer-implemented method can include evaluating, using the processing unit of the authentication server, a location measurement data received from the device by comparing the location measurement data against pre-approved data stored in a location database accessible to the authentication server. The location measurement data can include at least one of GPS data, GNSS data, radio signal strength data, and device identification data collected or generated by the device. The computer-implemented method can include evaluating, using the processing unit of the authentication server, travel pattern data received from the device by comparing the travel pattern data with historical travel records associated with the device. The computer-implemented method can include determining, using the processing unit of the authentication server, a data authenticity score based on the evaluation of the location measurement data and the travel pattern data.

The computer-implemented method can further include determining, using the processing unit of the authentication server, a device authenticity score using a change in the data authenticity score over time and time-domain patterns associated with the device.

The computer-implemented method can further include evaluating, using the processing unit of the authentication server, dwell times of the device in designated zones. The computer-implemented method can further include evaluating, using the processing unit of the authentication server, travel frequency of the device using designated routes. The computer implemented method can further include determining, using the processing unit of the authentication server, a user authenticity score in connection with a user of the device using the device authenticity score, the evaluation of the dwell times in designated zones, and travel frequency using the designated routes.

The computer-implemented method can further include granting, using the processing unit of the authentication server, permission to a resource provided by an application server in communication with the authentication server based on a comparison of the user authenticity score and a predetermined risk template.

A non-transitory computer-readable medium comprising instructions stored thereon is also disclosed. The instructions, when executed by a processing unit, can perform the method steps mentioned above. The methods, devices, or systems disclosed herein may be implemented in a variety of different ways. Certain embodiments have other steps or elements in addition to or in place of those mentioned above. The steps or elements will become apparent to those skilled in the art from the accompanying drawings or from the detailed description that follows.

BRIEF DESCRIPTION OF THE DRAWINGS

FIG. 4 illustrates a representation of location data.

FIG. 6A illustrates a representation of a candidate location, search radius, and safe zone.

FIG. 10 illustrates the merging of safe zones.

FIG. 11 illustrates time-domain patterns of the check-in data.

FIG. 13 represents a recorded time stamp.

DETAILED DESCRIPTION OF THE INVENTION

Figure 1:
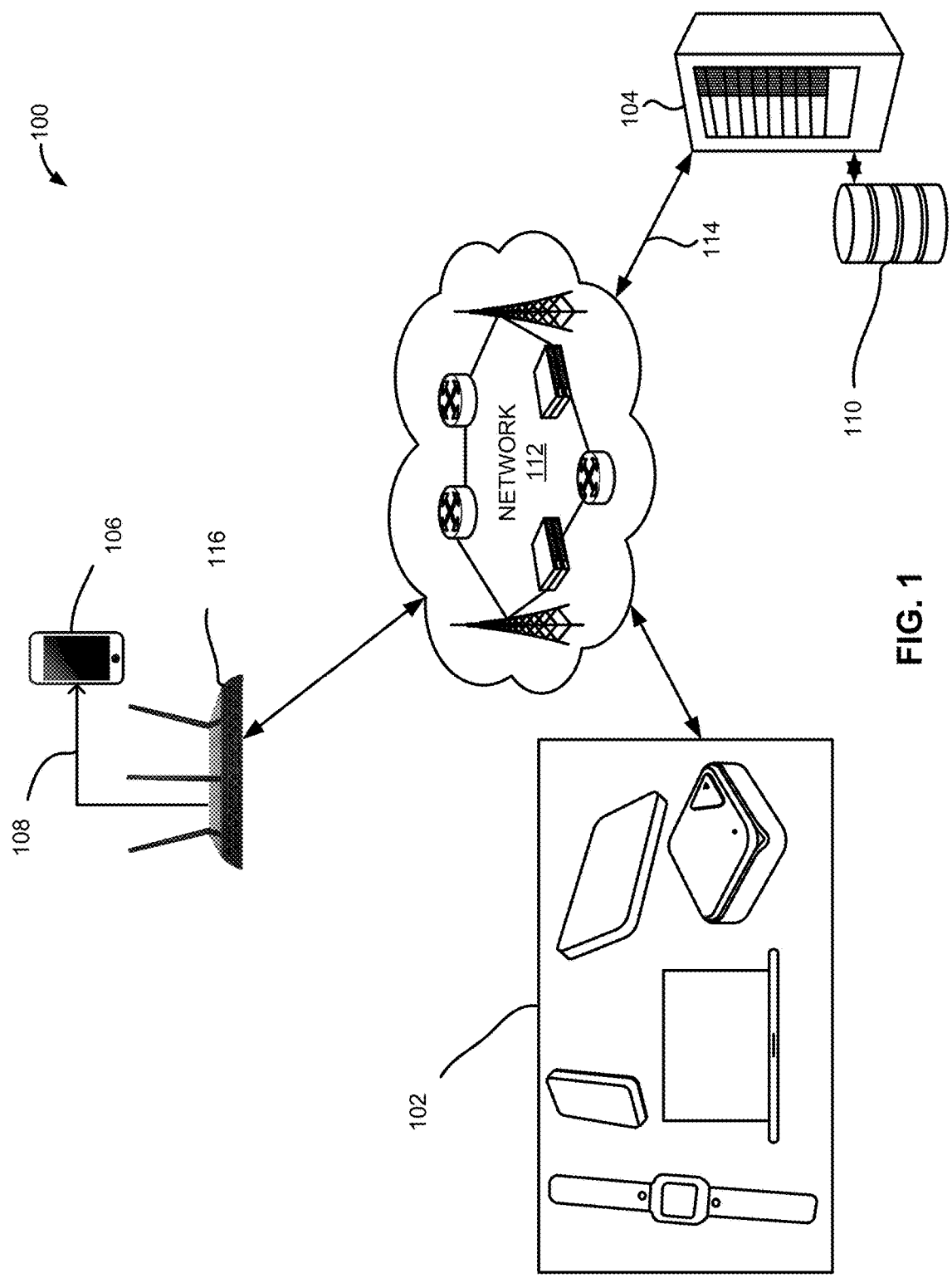
FIG. 1 illustrates a representation of a system for the generation and use of safe zones and safe routes associated with a device.

FIG. 1 illustrates a representation of a system 100 for generation and use of safe zones 604 and safe routes 1606 associated with a device 102. The system 100 can include a device 102, a server 104, an application device 106, an approval request 108, a database 110, a network 112, connections 114, and a wireless signal transceiver 116. The challenges involved in determining where a device 102 frequents and the routes that the device 102 takes stem from the sporadic check-in nature of the device 102. The sporadic nature of the check-in data 300 can be due to a variety of factors including the device 102 powering down, the device 102 not moving, or lack of wireless coverage. The device has some idea of where it is with some degree of certainly and it sends that.

Figure 2B:
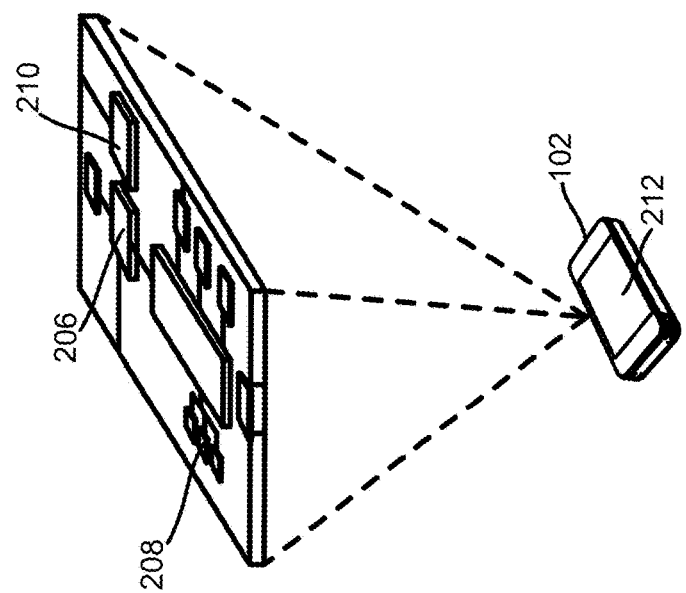
FIG. 2B illustrates a variation of a portable wireless device of the safe zone and route system.
Figure 2A:
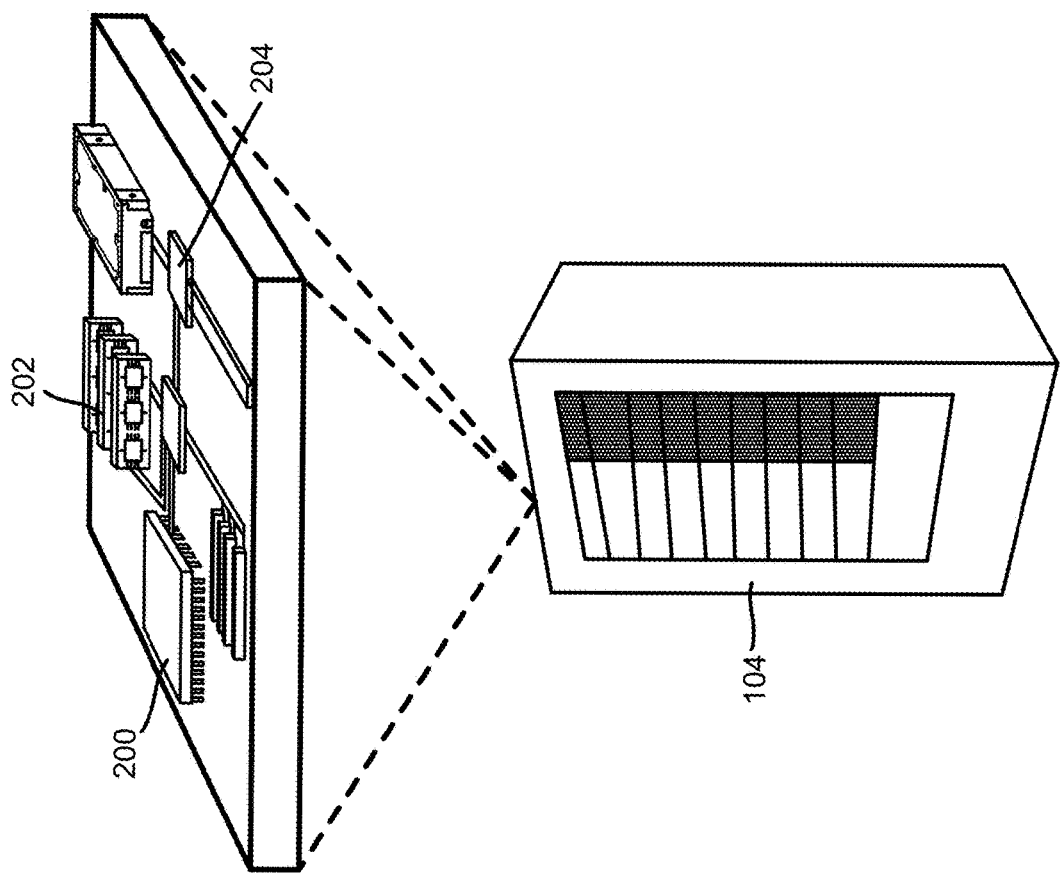
FIG. 2A illustrates a variation of a server of the safe zone and route system.

FIG. 2A illustrates a variation of the server 104 of the system 100. The server 104 can have a processing unit 200, a memory unit 202, and a server communication unit 204. The server can access a database 110. The database 110 can be local to the server or it can be in the cloud. The database 110 can be a check-in database 304, a location database 2802, a map database 2112, or another database 110 for information that is used or accessed by the server 104. The processing unit 200 can be coupled to the memory unit 202 and the server communication unit 204 through high-speed buses.

The processing unit 200 can include one or more central processing units (CPUs), graphical processing units (GPUs), Application-Specific Integrated Circuits (ASICs), field-programmable gate arrays (FPGAs), or a combination thereof. The processing unit 200 can execute software stored in the memory unit 202 to execute the methods or instructions described herein. The processing unit 200 can be implemented in a number of different manners. For example, the processing unit 200 can be an embedded processor, a processor core, a microprocessor, a logic circuit, a hardware finite state machine (FSM), a digital signal processor (DSP), or a combination thereof. As a more specific example the processing unit 200 can be a 64-bit processor.

The memory unit 202 can store software, data, logs, or a combination thereof. The memory unit 202 can be an internal memory as shown in FIG. 2A. Although not shown in the figures, it is contemplated by this disclosure that the memory unit 202 can be an external memory, such as a memory residing on a storage node, a cloud server, or a storage server. The memory unit 202 can be a volatile memory or a non-volatile memory. For example, the memory unit 202 can be a nonvolatile storage such as non-volatile random access memory (NVRAM), flash memory, disk storage, or a volatile storage such as static random access memory (SRAM). The memory unit 202 can be the main storage unit for the server 104.

The server communication unit 204 can include one or more wired or wireless communication interfaces. For example, the server communication unit 204 can be a network interface card of the server 104. The server communication unit 204 can be a wireless modem or a wired modem. In one embodiment, the server communication unit 204 can be a Wi-Fi modem. In other embodiments, the server communication unit 204 can be a 3G modem, a 4G modem, an LTE modem, a Bluetooth™ component, a radio receiver, an antenna, or a combination thereof. The server 104 can connect to or communicatively couple with the wireless signal transceivers 116, the network 112, or a combination thereof using the server communication unit 204. The server 104 can transmit or receive packets or messages using the server communication unit 204.

FIG. 2B illustrates an embodiment of the device 102. The device 102 can have a processor 206, a memory 208, a wireless communication module 210, and a display 212. The processor 206 can be coupled to the memory 208 and the wireless communication module 210 through high-speed buses.

The processor 206 can include one or more CPUs, GPUs, ASICs, FPGAs, or a combination thereof. The processor 206 can execute software stored in the memory 208 to execute the methods or instructions described herein. The processor 206 can be implemented in a number of different manners. For example, the processor 206 can be an embedded processor, a processor core, a microprocessor, a logic circuit, a hardware FSM, a DSP, or a combination thereof. As a more specific example the processor 206 can be a 32-bit processor such as an ARM™ processor.

The memory 208 can store software, data, logs, or a combination thereof. In one embodiment, the memory 208 can be an internal memory. In another embodiment, the memory 208 can be an external storage unit. The memory 208 can be a volatile memory or a non-volatile memory. For example, the memory 208 can be a nonvolatile storage such as NVRAM, Flash memory, disk storage, or a volatile storage such as SRAM. The memory 208 can be the main storage unit for the device 102.

The wireless communication module 210 can include a wireless communication interface or chip. For example, the wireless communication module 210 can be a network interface card of the device 102. The wireless communication module 210 can be a wireless modem. In one embodiment, the wireless communication module 210 can be a Wi-Fi modem. In other embodiments, the wireless communication module 210 can be a 3G modem, a 4G modem, an LTE modem, a Bluetooth™ component, a radio receiver, an antenna, or a combination thereof. The device 102 can connect to or communicatively couple with the wireless signal transceivers 116, the network 102, or a combination thereof using the wireless communication module 210. The device 102 can transmit or receive packets or messages using the wireless communication module 210.

In one variation, the device 102 can also comprise a locational unit having a GPS receiver, an inertial unit, a magnetometer, a compass, or a combination thereof. The GPS receiver can receive GPS signals from a GPS satellite. The inertial unit can be implemented as a multi-axis accelerometer including a three-axis accelerometer, a multi-axis gyroscope including a three-axis MEMS gyroscope, or a combination thereof.

The display 212 can be a touchscreen display such as a liquid crystal display (LCD), a thin film transistor (TFT) display, an organic light-emitting diode (OLED) display, or an active-matrix organic light-emitting diode (AMOLED) display. In certain embodiments, the display 212 can be a retina display, a haptic touchscreen, or a combination thereof. For example, when the device 102 is a smartphone, the display 212 can be the touchscreen display of the smartphone.

Figure 5:
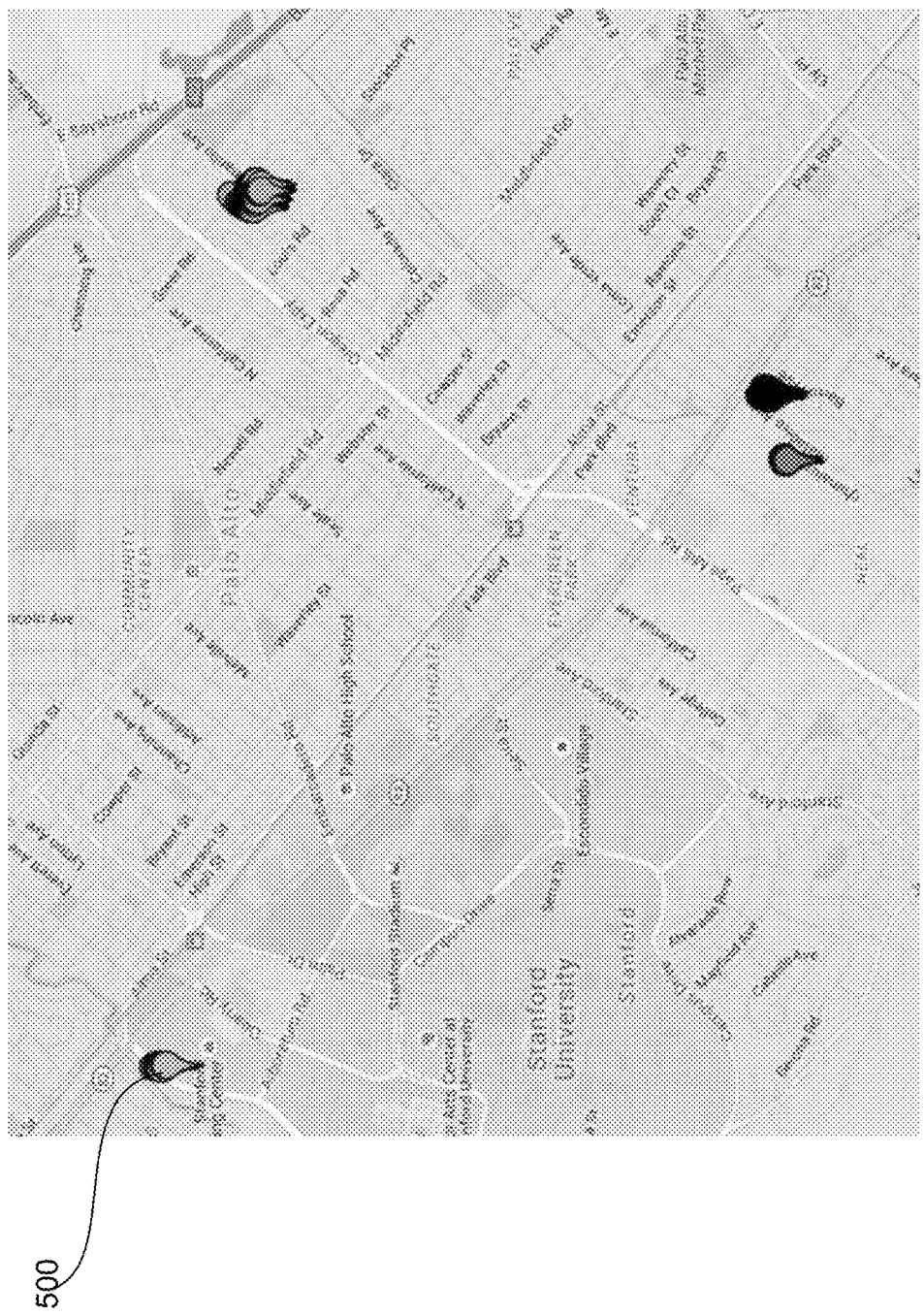
FIG. 5 illustrates a representation of geographic locations.

FIG. 5 illustrates a representation of several geographic locations 500 on a map. The map can be any of those provided by online companies including Google and Microsoft. The icon location can pinpoint an address, landmark, and longitude/latitude location. A zoom function can be used to obtain a more precise representation of the geographic location 500.

Figure 3:
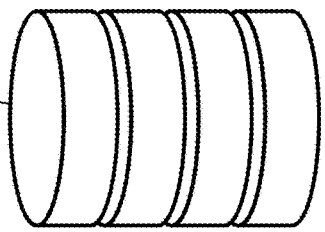
FIG. 3 illustrates a representation of check-in data and associated time stamps.

FIG. 3 illustrates a representation of check-in data 300 and associated time stamps 302 associated with geographic locations 500 which can be stored in a check-in database 304. This check-in data 300 can be gathered from smartphones or other devices 102 which are capable of receiving radio signals suitable for location determination, such signals including cellular (2G/3G/4G and beyond), Wi-Fi, Bluetooth™, GNSS (GPS/GLONASS/Galileo/Beidou), NFC, etc.

Figure 4:
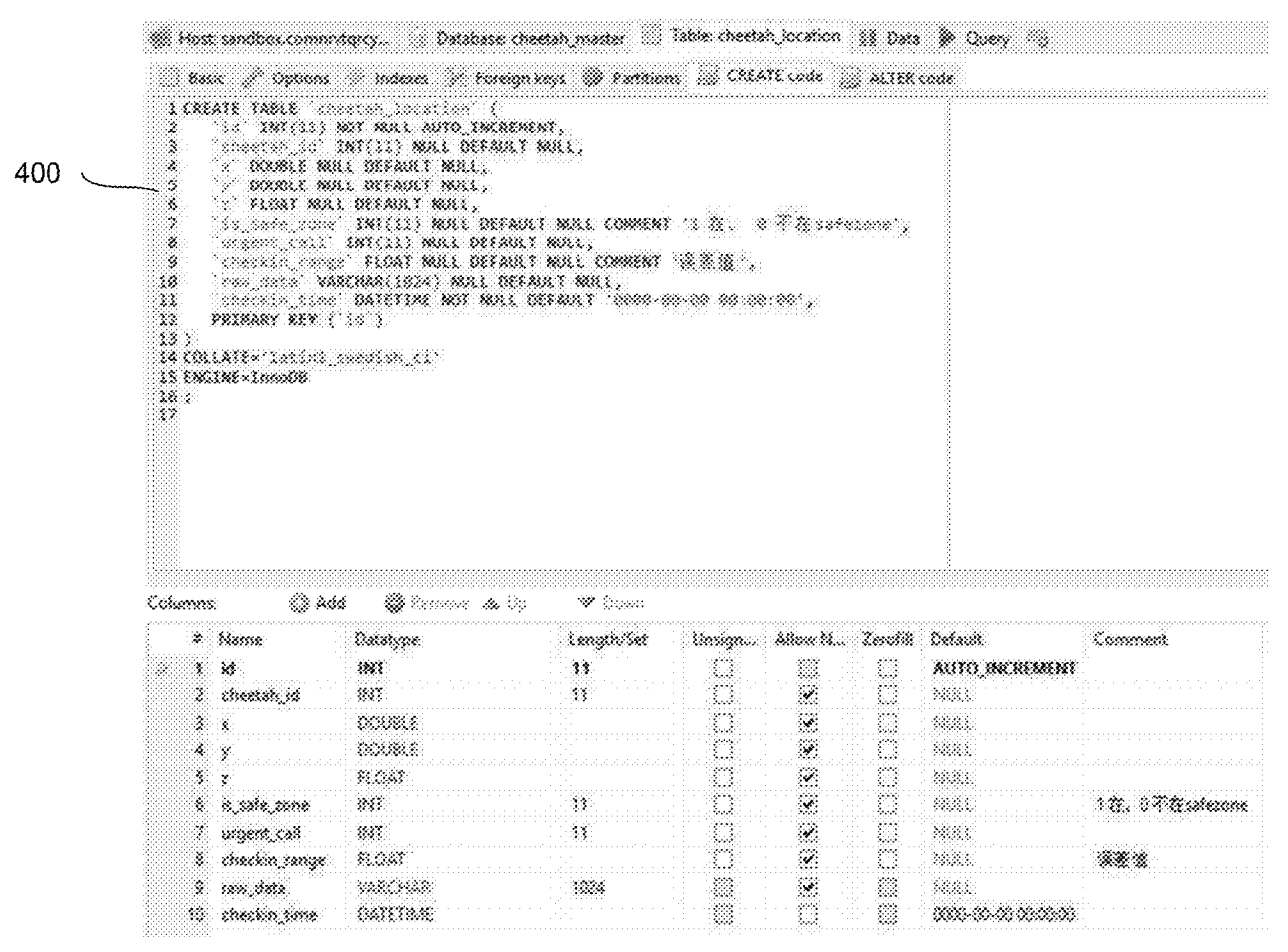

FIG. 4 illustrates a representation of location data 400. The location data 400 can be collected by methods that are secure. We neither assume nor require that the data are collected at regular time-intervals or even continuously (there may be large unexpected/unpredictable gaps). Due to device 102 power-saving methods, location data 400 may be very sparse in time. The device 102 can upload measurements and/or location data 400 to a server 104. Measurements and/or location data 400 can be further processed at a server and then stored in a database 110. The measurement data reported by the device 102 can be used to evaluate the trustworthiness of the location information available at the device 102 or computed at the server 104.

FIG. 6A illustrates a representation of a candidate location 600, search radius 602, and safe zone 604. Safe zones 604 can be frequently stayed or visited places where the location data 400 exhibit regular dwell patterns. Examples include home at night time, office or school during the workday, stores visited on weekends, etc. Safe zones 604 are calculated by selecting locations where the device 102 has spent sufficient time and marking them as candidates for safe zones 604. One method to compute safe zones 604 is a density based clustering algorithm, whereby the dwell time 702 is accumulated over a period of time, and close-by locations can be merged to form a contiguous safe zone 604 of complex shape.

Another method to compute safe zones 604 is a cluster splitting algorithm. In this method we start with a single large zone and then split the zone based on criteria or cost functions until we have a desired number of safe zones 604. The cost function can comprise a number of factors including dwell times, geographic locations, and time between check-ins.

A first geographic location 900 from the check-in data 300 can be selected as a candidate location 600. The first geographic location can be selected because it is the earliest, most recent, or because of some other decision criteria. A search radius 602 around the candidate location 600 based on position uncertainty or other contextual criteria 608 can be chosen. All other points including core points 606 within the search radius 602 can be found.

Figure 7:
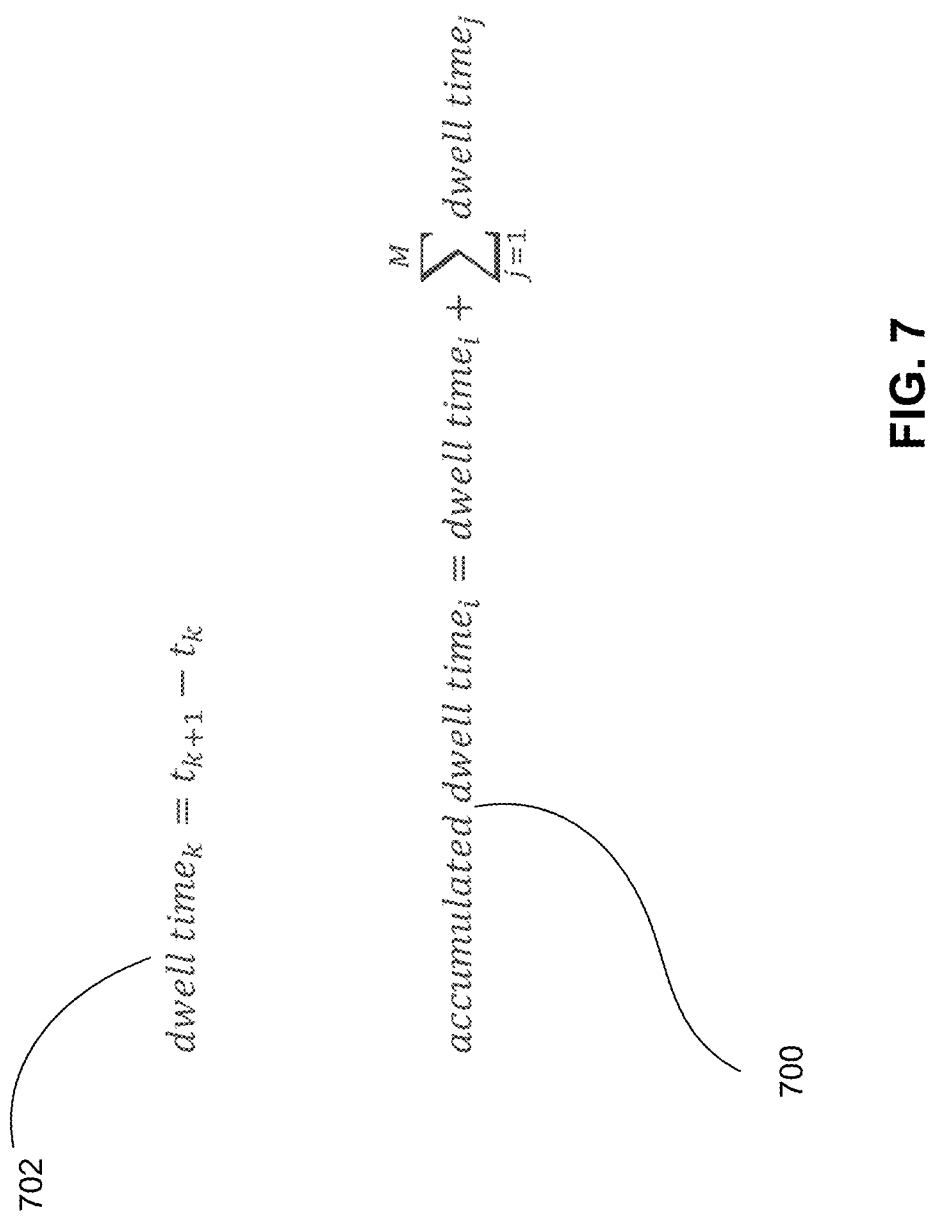
FIG. 7 illustrates the calculation of dwell times and accumulated dwell times.

FIG. 7 illustrates the calculation of dwell times 702 and accumulated dwell times 700. Dwell time 702 may have a configurable upper limit in order to protect against powered off devices or missed check-ins. Dwell time 702 is an important design parameter, and thus dwell time 702 may be normalized based on the length of the observation window and the total number of data points collected within that observation window.

Figure 6B:
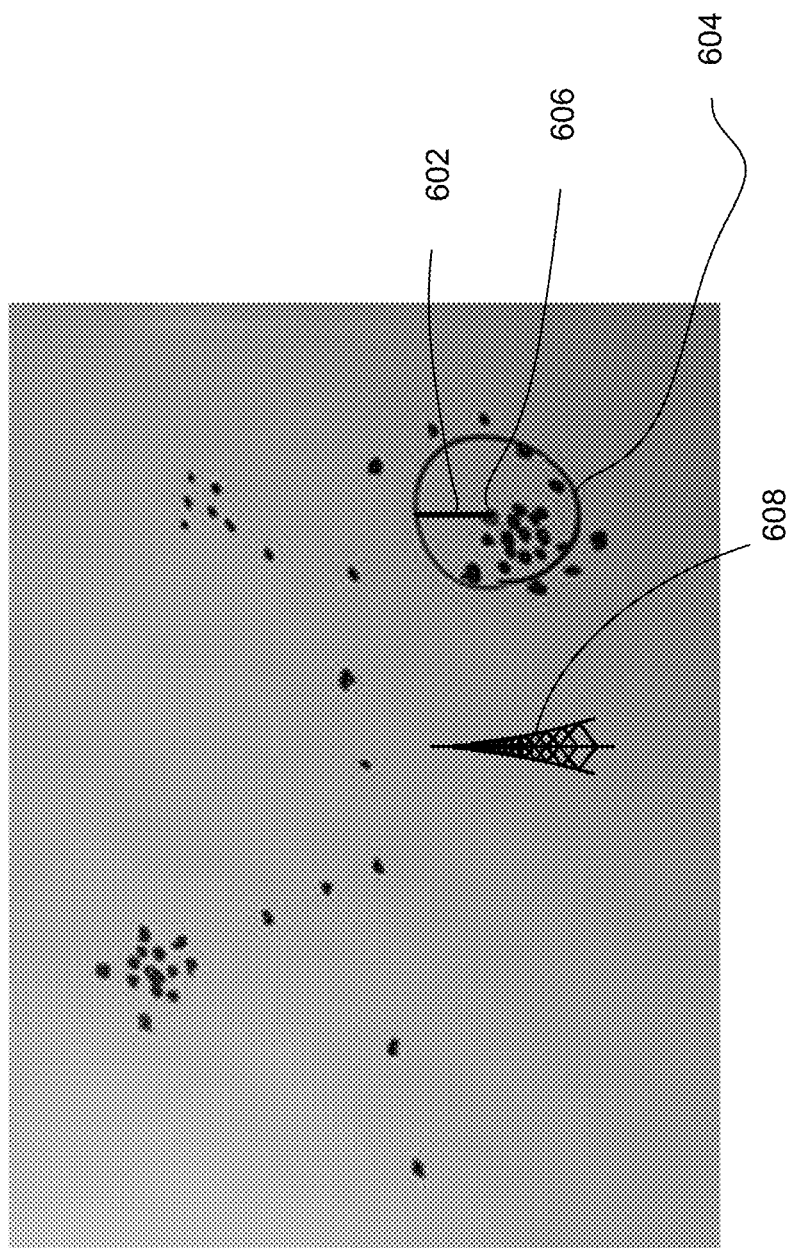
FIG. 6B illustrates a representation of a core point, search radius, and safe zone.

FIG. 6B illustrates a representation of a core point 606, search radius 602, and safe zone 604. The search radius 602 can depend on the type of environment. Types of environments can include GPS, Wi-Fi, and cell radio. The search radius 602 can be geography agnostic. Typical values for the search radius 602 are 5 meters, 10 meters, and 30 meters.

Figure 8:
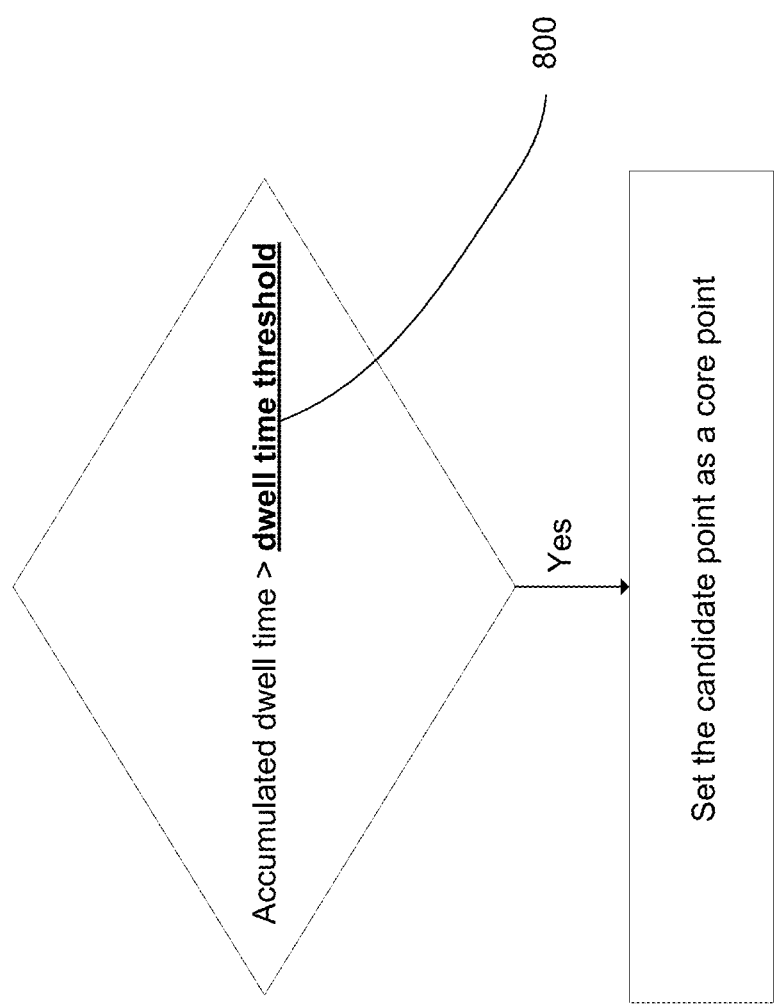
FIG. 8 illustrates the system performing a core point calculation.

FIG. 8 illustrates the system performing a core point 606 calculation. An accumulated dwell-time 700 of the device 102 using the check-in data 300 associated with the geographic locations 500 within the search radius 602 can be calculated. The candidate location 600 can be set as a core point 606 when the accumulated dwell-time 700 exceeds a dwell-time threshold 800. If the core point 606 intersects a previously established safe zone 604, then this core point 606 can be merged with that safe zone 604. A new safe zone 604 can be generated around the core point 606 using the search radius 602 when the core point intersects one or more other core points which have not yet joined a safe zone 604 cluster.

Figure 9:
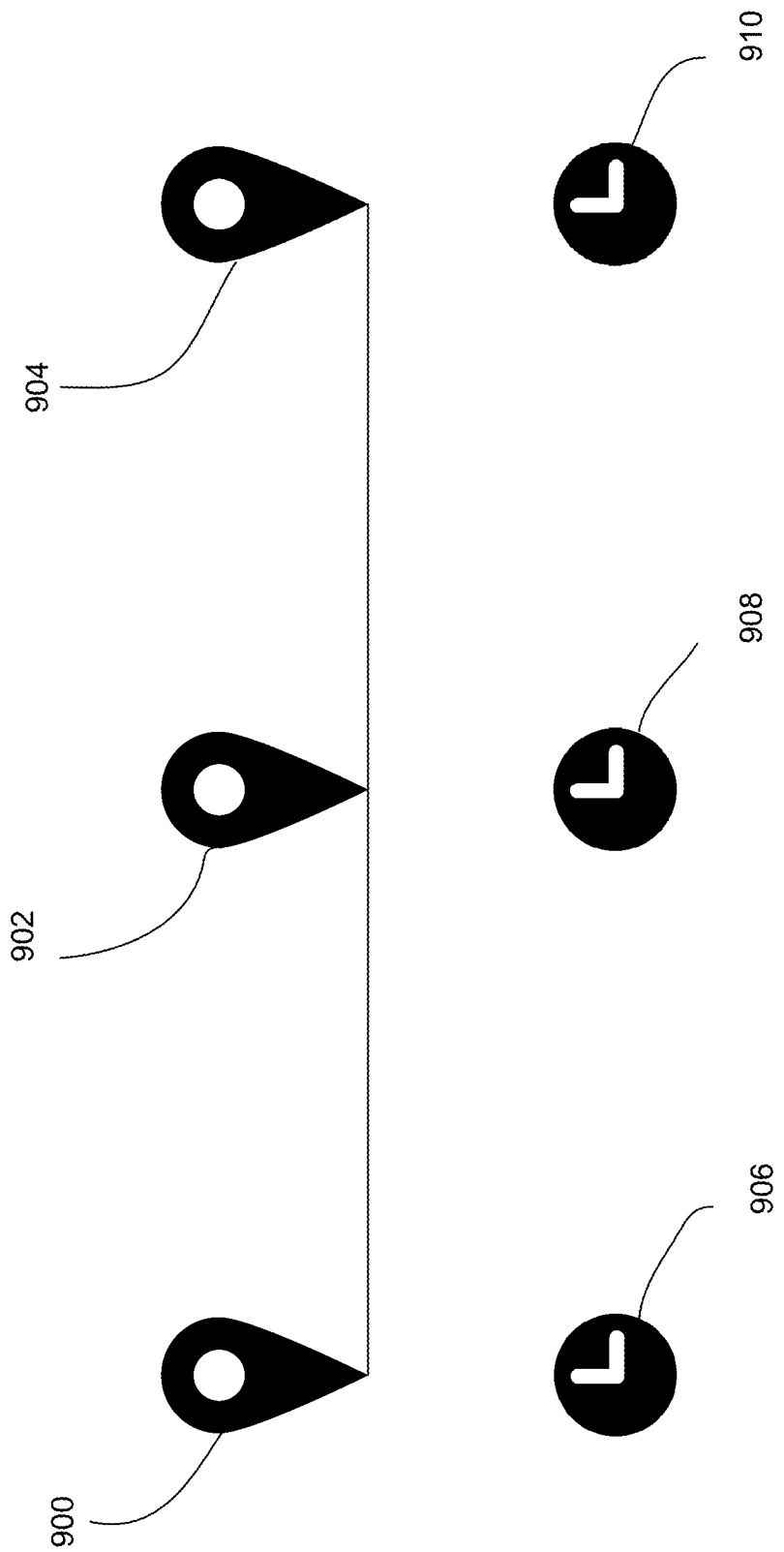
FIG. 9 illustrates an intermediate time stamp associated with an intermediate geographic location.

FIG. 9 illustrates an intermediate time stamp 908 associated with an intermediate geographic location 902. As the input location data may be sparse or without regular time interval, they can be normalized before applying the clustering algorithm. One method of normalization is to add intermediate points by interpolating along the time axis. Another method of normalization is to assign the dwell time 700 to the first position of an interval. Points in a safe zone 604 tend to be close to each other making this method a good approximation.

The method to compute a safe zone allows for the presence of points not belonging to any safe zone 604, which could be due to inaccurate measurements, or movements outside safe zones 604.

FIG. 10 illustrates the merging of safe zones 604. The merging of a further safe zone 1000 with a safe zone 604 to form a merged safe zone 1002 can occur when the area of the safe zone 604 intersects the area of the further safe zone 1000. The merged safe zone 1002 can be a union of the area of the safe zone 604 and the area of the further safe zone 1000.

FIG. 11 illustrates time-domain patterns 1100 of the check-in data. In this illustration there are time-domain patterns 1100 for five zones. For each zone there are hour, week, and month entries. The hour entries show the number of check-ins that occurred in each of the hour slots starting from hour 0 until hour 23. The week entries show the number of check-ins that occurred in each of the of the days starting from day 0 until day 6. The month entries show the number of check-ins that occurred in each of the days starting from day 1 until day 31. Note that there can be entries for any hour, week or month slot. From these time-domain patterns it is clear that Zone 0 is frequented more than Zone 1 which is frequented more than Zone 2 which is frequented more than Zone 3 which is frequented more than Zone 4.

Figure 12:
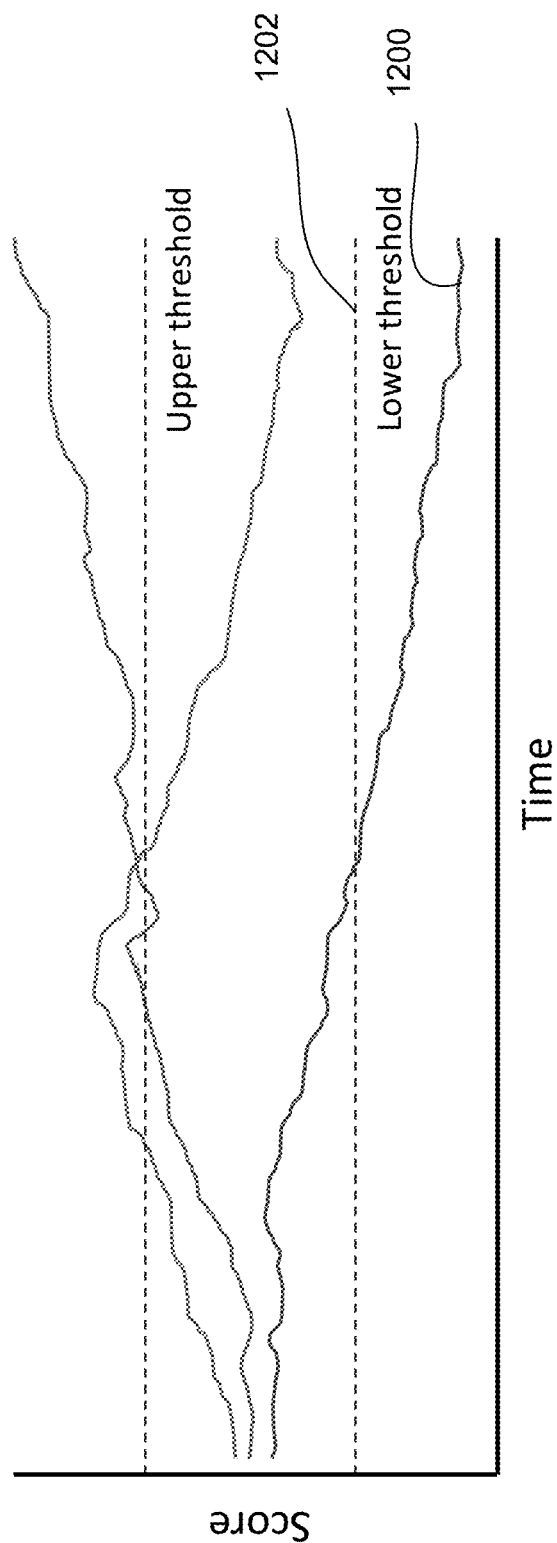
FIG. 12 illustrates thresholds of a safe zone score.

FIG. 12 illustrates zone score thresholds 1202 of a safe zone score 1200. Safe zone scores 1200 can be calculated for each safe zone 604 based on time-domain patterns 1100. The safe zone score 1200 can be increased when the device 102 visits a safe zone 604 frequently. In one scenario, frequently can mean more than a certain number of days per month. Or the frequency can be normalized by the total time duration of the data used in the calculation. The safe zone score 1200 can also be increased based on how regularly the device visits the safe zone 604. This regularity can be based on similar time-of-day, day-of-week, day-of-month, or a combination thereof. The safe zone score 1200 can also be increased based on regularity of safe zone groups. For example, regularity of safe zone groups might be determined by a group of safe zone 604 groups being visited in a particular order. Safe zone scores 1200 may also be increased when new device location data is in agreement with past location determination. A safe zone score 1200 may also be increased when a device 102 user approves a safe zone 604 candidate suggested to the device 102 user. A safe zone score 1200 may also be increased when there is correlation with other known information such as home/office/school addresses, co-location with known devices 102, credit card transactions, computer log-ins, web sign-ins, or a combination thereof. A safe zone score 1200 may also be increased when there is a correlation of a user's safe zone 604 with another user's safe zone 604. For example, one or more users with devices 102 may attend the same school or work at the same location.

The system can decrease the safe zone score 1200 when the movement of the device 102 lacks regular patterns. The system can decrease the safe zone score when the current device 102 movement deviates from past patterns of the device 102. New repeated movements of device 102 deviation can also exhibit regularity in which case a new pattern may be established.

A safe zone 604 candidate can be accepted when the safe zone score 1200 exceeds an upper threshold. The threshold can be determined using a learning algorithm. The learning algorithm can be different for different applications.

Safe zones 604 that are accepted can be approved by a user. Approval can increase the safe zone score 1200. For example, let's suppose a child is carrying a device 102 to school. The system can send the parent's application device 106 an approval request 108, "Your child has been in this location all day; is this location a safe zone?" The parent can reply through the application device 106 and confirm the location is a safe zone 604. The system can now increase the safe zone score 1200. If the parent did not confirm that the location is a safe zone 604, then the safe zone score 1200 could stay the same.

Figure 13:
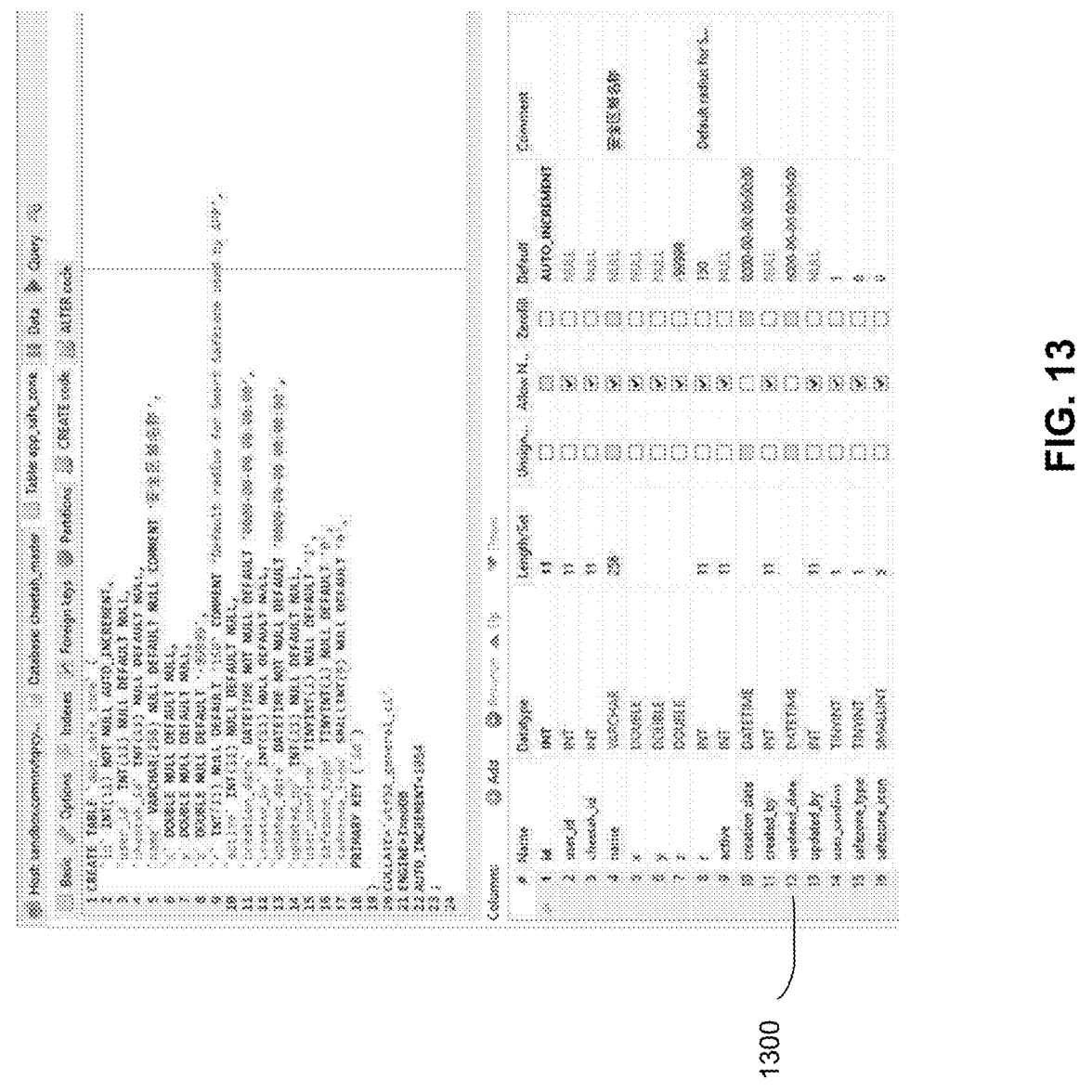

FIG. 13 represents a last recorded time stamp 1300. The last recorded time stamp 1300 can be comprised of the location of the time stamp, and the time of the time stamp. The location can be expressed in terms of longitude, latitude, and elevation. The time can be expressed in terms of Year, Month, Day, and 24-hour time-of-day. The difference between the current time and the time of the last recorded time stamp 1300 can be calculated. The system can decrease a safe zone score 1200 when the difference between the current time and the last recorded time stamp 1300 associated with the safe zone 604 exceeds a maximum time threshold 1400.

Figure 14:
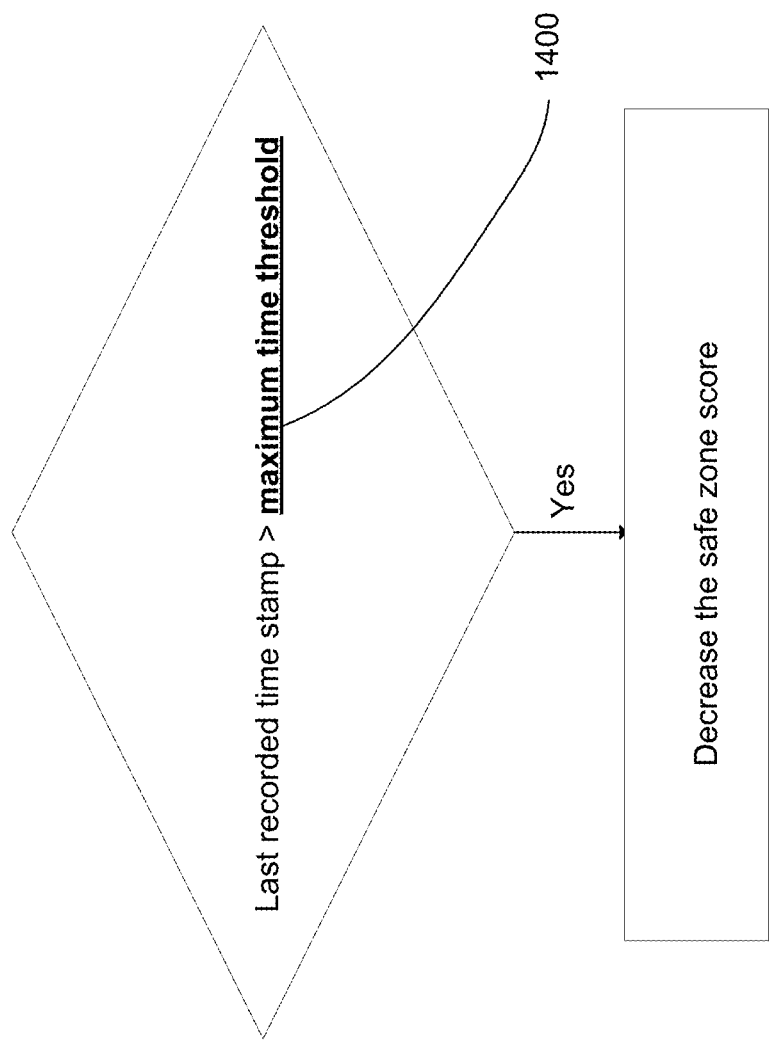
FIG. 14 illustrates the system decreasing a safe zone score when a maximum time threshold is exceeded.

FIG. 14 illustrates the system decreasing a safe zone score 1200 when a maximum time threshold 1400 is exceeded. The safe zone score 1200 can be decreased when the elapsed time since the last recorded time stamp exceeds a maximum time threshold 1400. This decreasing of safe zone scores 1200 can be used to decay away safe zones 604 that are no longer being frequented.

An example of a safe zone score 1200 calculation is as follows. If the device 102 checks into the safe zone 604 of the home within 5 hours of 1:00 AM and is in the safe zone 604 for greater than 8 hours then increase the safe zone score 1200 by 2. If the device 102 checks into the safe zone 604 of the home within 5 hours of 1:00 AM and is in the safe zone 604 for between 4 and 8 hours then increase the safe zone score 1200 by 1. If the device 102 does not check into the safe zone 604 of the home then decrement the safe zone score 1200 by 1.

An example of a safe zone score 1200 calculation is as follows. If the device 102 checks into the safe zone 604 of the office within 4 hours of 1:00 PM and is in the safe zone 604 for greater than 6 hours then increase the safe zone score 1200 by 2. If the device 102 checks into the safe zone 604 of the office within 4 hours of 1:00 PM and is in the safe zone 604 for between 2 and 6 hours then increase the safe zone score 1200 by 1. If the device 102 does not check into the safe zone 604 of the office then decrease the safe zone score 1200 by 1.

An example of a safe zone score 1200 calculation is as follows. If the device checks into the safe zone 604 of the home and the safe zone 604 of the office then increase the safe zone score 1200 by 1. If the device does not check into both the safe zone 604 of the home and the safe zone 604 of the office then decrease the safe zone score 1200 by 1.

Figure 15B:
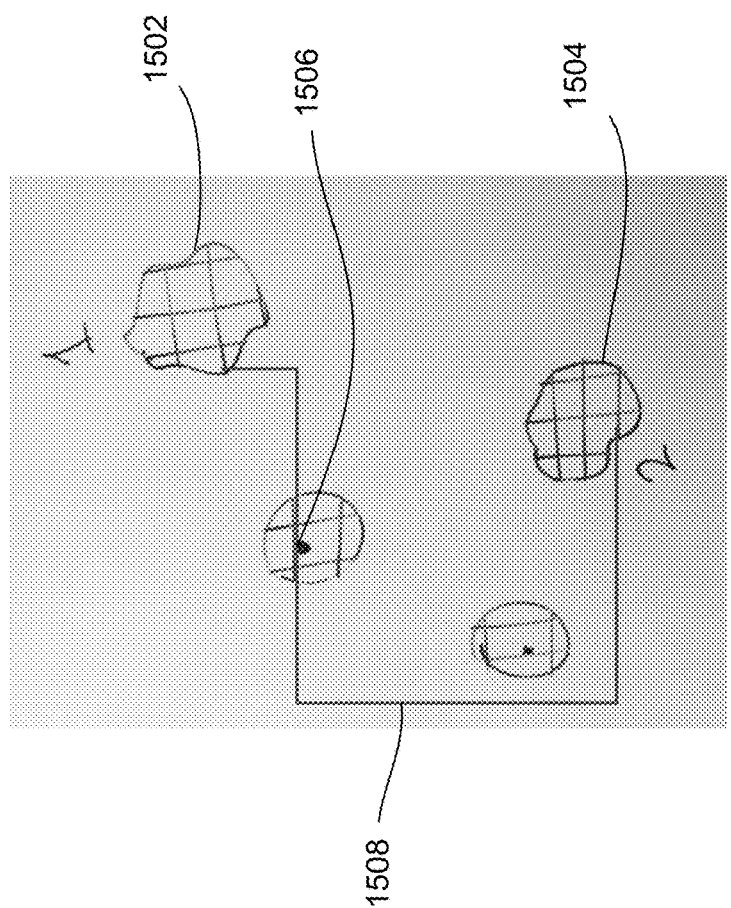
FIG. 15B illustrates a route between a starting zone and a destination zone.
Figure 15A:
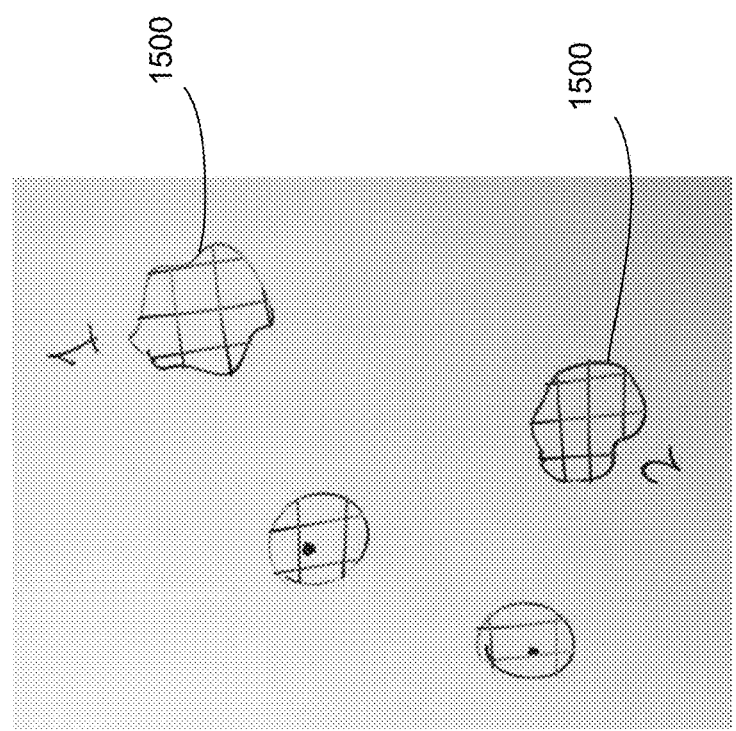
FIG. 15A illustrates geographic zones.

FIG. 15A illustrates geographic zones 1500 associated with a device 102. Zone 1 can be a home. Zone 2 can be an office. The areas of Zone 1 and Zone 2 can be different from each other.

FIG. 15B illustrates a route between a starting zone 1502 and a destination zone 1504. The system can be used to identify at least one first intermediate geographic location 1506 from the check-in data 300 in connection with a first tracked route 1508 taken by the device 102 from the starting zone 1502 to the destination zone 1504. The first intermediate geographic location 1506 is not within any of the geographic zones 1500.

Figure 16A:
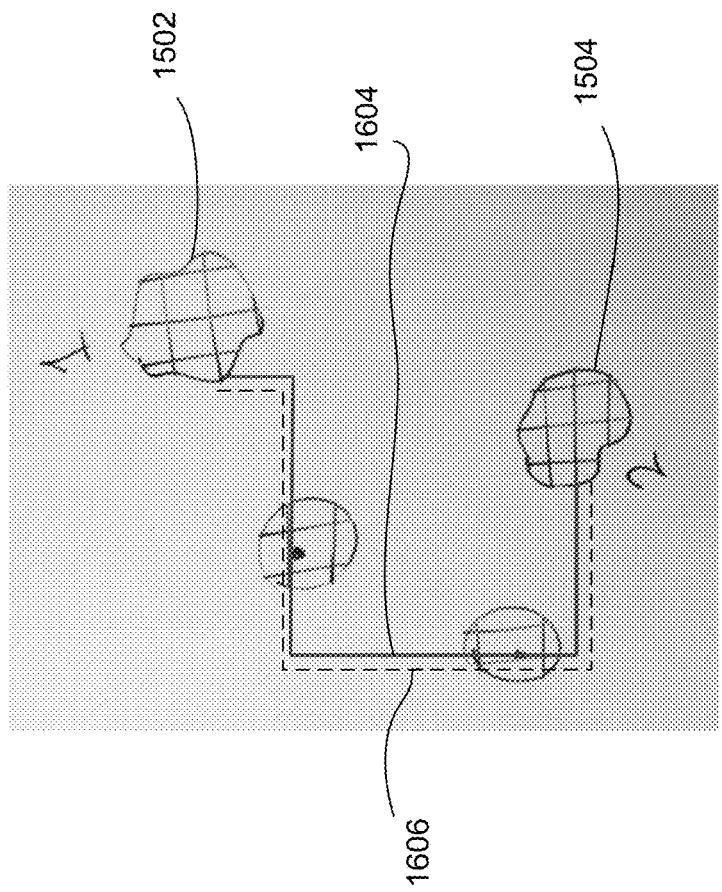
FIG. 16A illustrates a second intermediate geographic location.

FIG. 16A illustrates one second intermediate geographic location 1600 from the check-in data 300 in connection with a second tracked route 1602 taken by the device 102 from the starting zone 1502 to the destination zone 1504. The second intermediate geographic location 1600 is not within any of the geographic zones 1500.

Figure 16B:
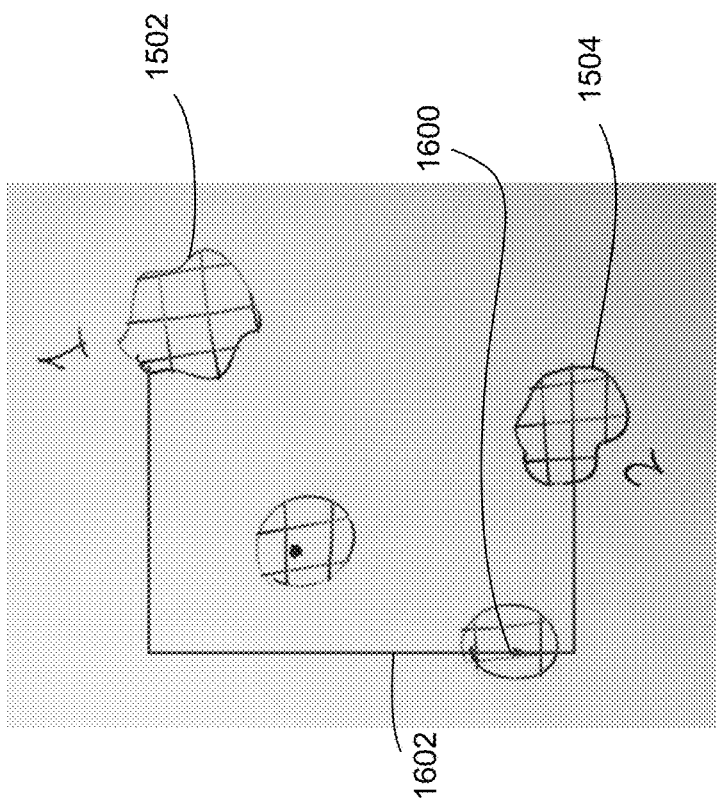
FIG. 16B illustrates a candidate safe route between a starting zone and a destination zone.

FIG. 16B illustrates a candidate safe route 1604 connecting the starting zone 1502, the first intermediate geographic location 1506, the second intermediate geographic location 1600, and the destination zone 1504. Safe routes 1606 can be frequently traveled routes from one safe zone 604 to another or from one safe zone 604 back to itself.

Safe routes 1606 can be calculated in the following manner. The system 100 determines a safe zone 604. Data points that belong to safe zones 604 are excluded from the safe route 1606 calculation. The location data 400 can be grouped into trips that are contiguous in time from one safe zone 604 to another or from one safe zone 604 back to itself. The two directions can be treated as distinct trips as they often have different time-domain patterns 1100. An example of different time-domain patterns 1100 is home-to-work in the morning and work-to-home in the evening. The starting zone 1502 and the destination zone 1504 may be the same in which case we have a round trip. An example of a round trip is an errand run. Trips with duration not commensurate with distance can be excluded. An example of when this may happen is when the device 102 is powered off due to low battery during a trip. The starting zone 1502, points on a trip, and the destination zone 1504 can be connected to form a candidate safe route 1604. The connection may take into account routing metrics such as distance, speed, one-way roads, and turn restrictions. When no road data are available for the region containing the trip, location points from multiple trips between the starting zone 1502 and destination zone 1504 can be grouped together to form a discernible route pattern. A route can be computed by linking a point to its nearest neighbor, starting from the starting zone 1502.

Figure 21:
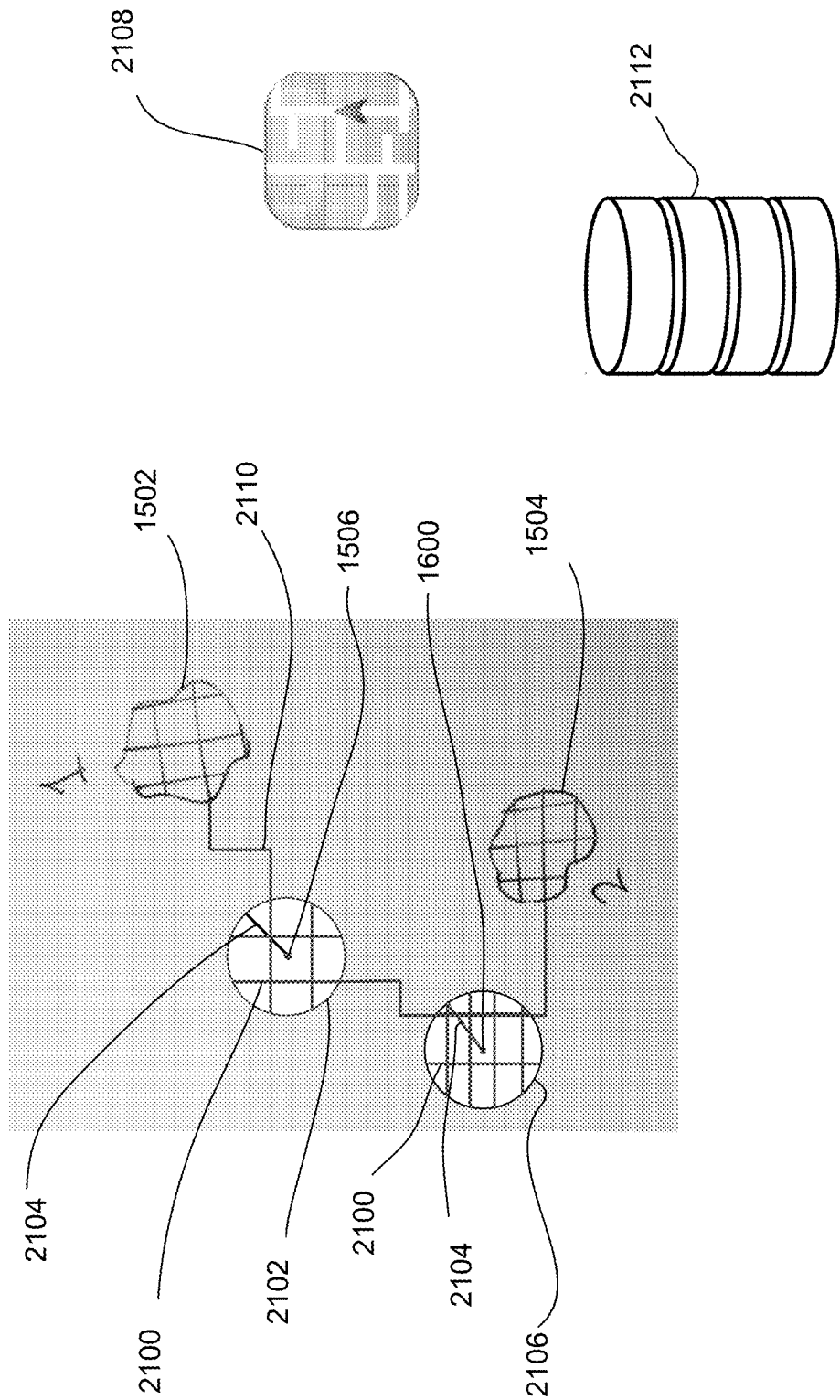
FIG. 21 illustrates the determination of a candidate route segment using a global minimum-cost route.

FIG. 21 illustrates candidate route segments 2100, a first configurable area 2102, a tolerance radius 2104, a second configurable area 2106, a routing algorithm 2108, a global minimum cost route 2110, and a map database 2112. When road data are available for the region containing the trip, location points may be matched to the road segments in a map database 2112. Steps in one possible method follow. Take each measured location and fetch all road segments within a certain tolerance radius 2104 from the map database 2112. The tolerance radius 2104 can be determined by the accuracy of the measurement. These sets of road segments can be arranged in increasing order of time, beginning at the starting zone 1502. A routing algorithm 2108 can be applied between all road segments of consecutive sets thus obtained, using a cost function that may include distance, speed, one-way roads, and turn restrictions. An example of a routing algorithm 2108 is Dijkstra's many-to-many algorithm. Another routing calculation can be performed using all the candidate route segments 2100 from the previous step to find the route that has the lowest cost between the starting zone 1502 and the destination zone 1504. This can be the candidate safe route 1604 for this particular trip. The above algorithm can also be performed in reverse time order, beginning with the destination zone 1504 and taking into account reverse road direction. The 2-step routing described above is a kind of soft-decision algorithm to produce the best overall route that is tolerant of sparsity of data and measurement errors.

Candidate safe routes 1604 from multiple routes can be clustered by similarity. The primary metric of similarity can be the percentage of common road segments. The common road segments can be contiguous. Secondary metrics can include time-domain patterns 1100. Examples of time-domain patterns include time of day, day of week, and day of month. The most representative route within a cluster can be chosen as representative of the cluster. Some segments of a candidate route can appear in multiple clusters due to the fact that a device may take partially different routes on different trips.

Figure 17:
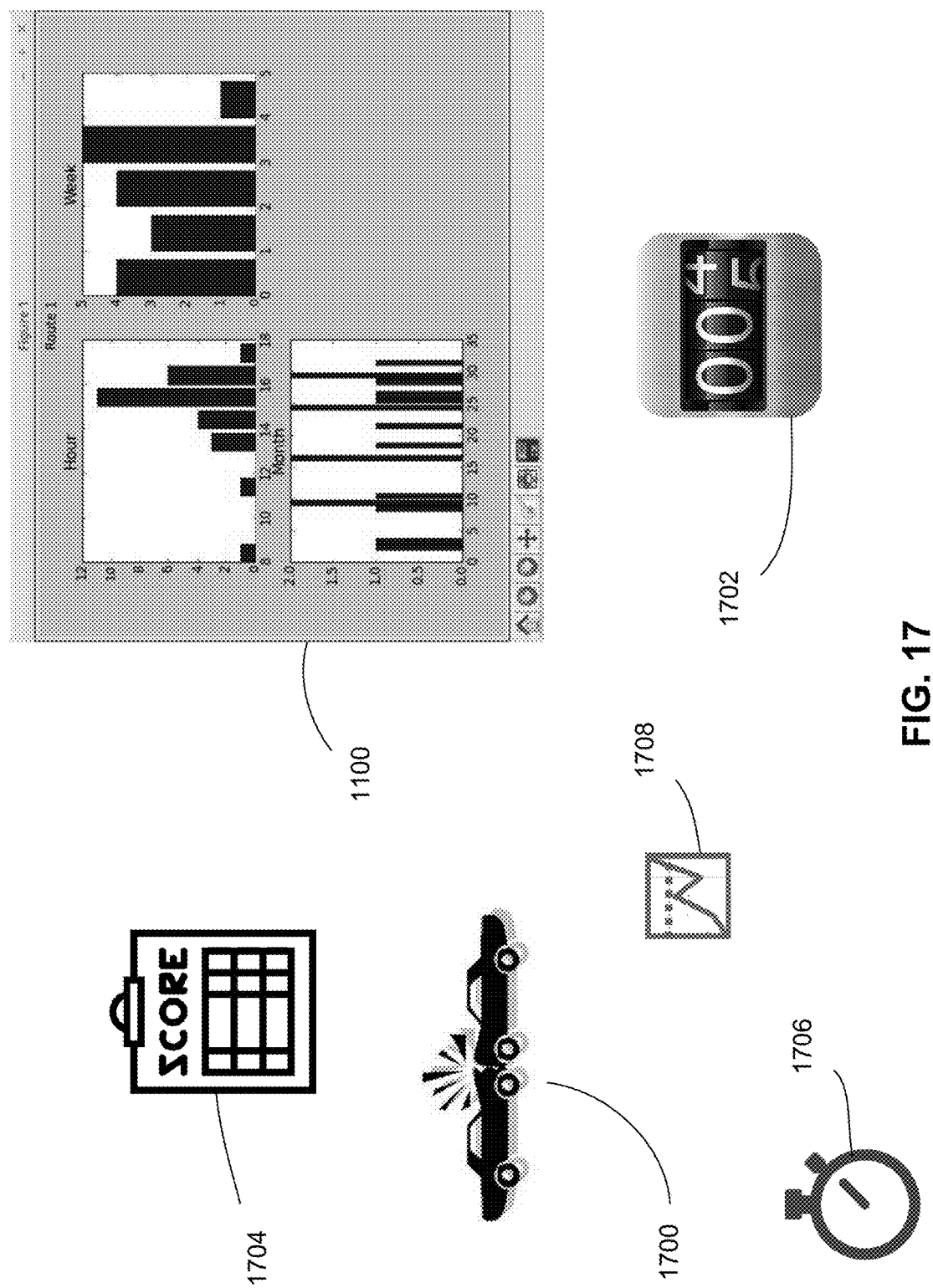
FIG. 17 illustrates elements involved in the calculation of a safe route score including accident rates, route traversal counts, trip duration, and maximum duration threshold.

FIG. 17 illustrates elements involved in the calculation of a safe route score 1704 including accident rates 1700, route traversal counts 1702, trip duration 1706, and maximum duration threshold 1708. Scores can be calculated for each cluster of similar routes. Scores can be increased by the number of routes in a group, normalized by the total time window of the data used in the calculation. Scores can be increased when there are regular patterns in the time domain. Examples of these regular patterns can be time of day, day of week, and day of month. Scores can be increased when there are data in agreement with previous determinations. Scores can be increased when there is user approval of a suggested safe route 1606. Scores can be increased when there is correlation with other known information. Examples of other known information can include accident rates 1700, and crime rates in the traversed region. Scores can be increased when there is correlation with safe routes 1606 from related devices 102.

Scores can be decreased when there is a small number of routes in the group, normalized by the total time window of the data used in the calculation. Scores can be decreased when there is a lack of regular time domain patterns 1100. Scores can be decreased when there is fresh data that deviates from past patterns. If repeated deviations exhibit some regularity, then new patterns can be established. Scores can be decreased when the age of the location data is above a certain threshold so that more weight is given to recent data. Scores can be decreased when there is a high accident rate 1700 or a high crime rate in the traversed region.

Figure 18:
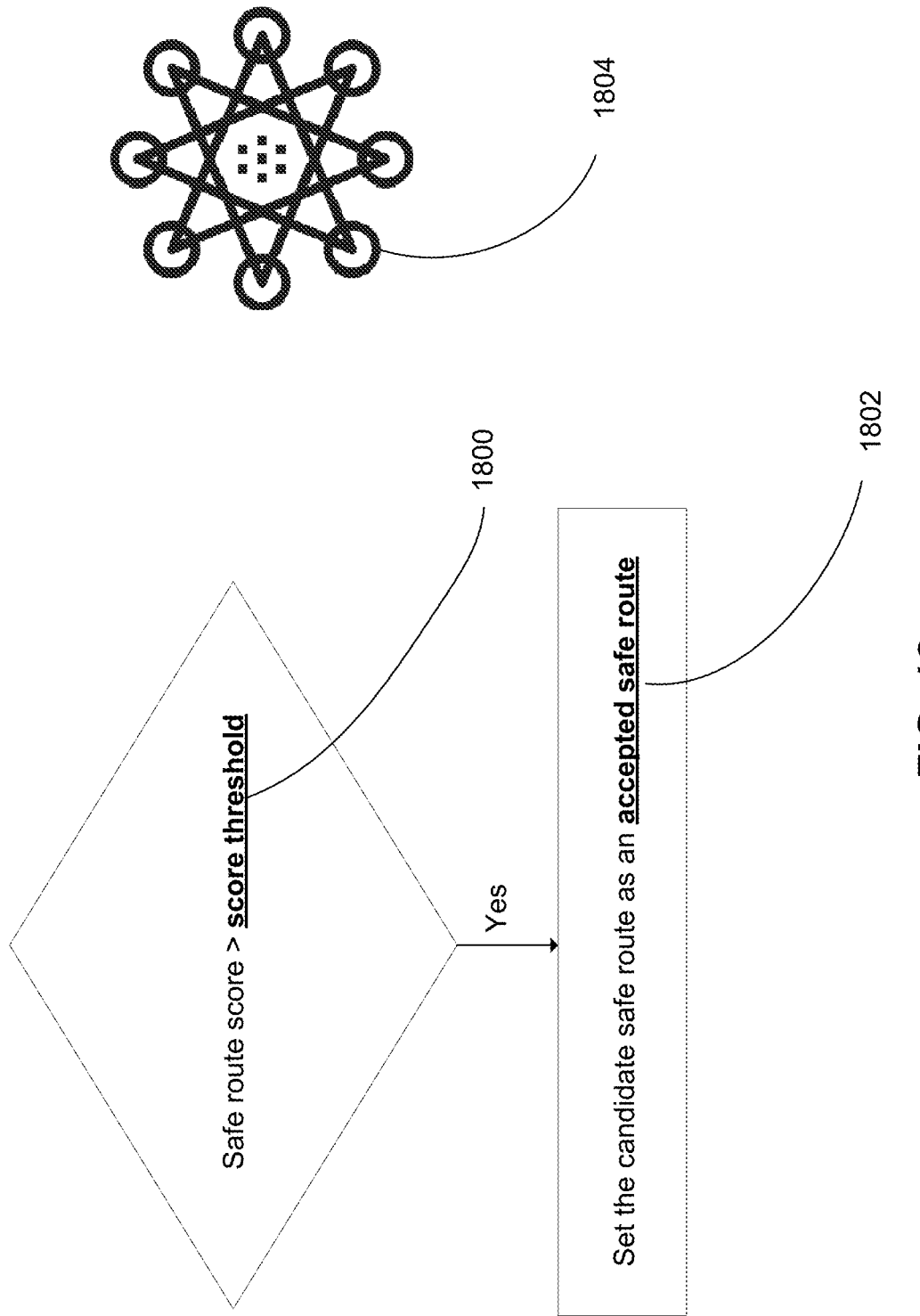
FIG. 18 illustrates a calculation setting a candidate safe route as an accepted safe route.

FIG. 18 illustrates a calculation setting a candidate safe route 1604 as an accepted safe route 1802 when the safe route score 1704 passes a score threshold 1800. The score threshold 1800 can be determined using a learning algorithm 1804 and may be different for different applications. Accepted safe routes 1802 can be presented to the device user as an approval request 108.

Safe routes 1606 can be used to detect unusual behavior and alert interested parties. An example of such an alert is notification of parents when a child is taking an unusual route when leaving school.

Figure 22:
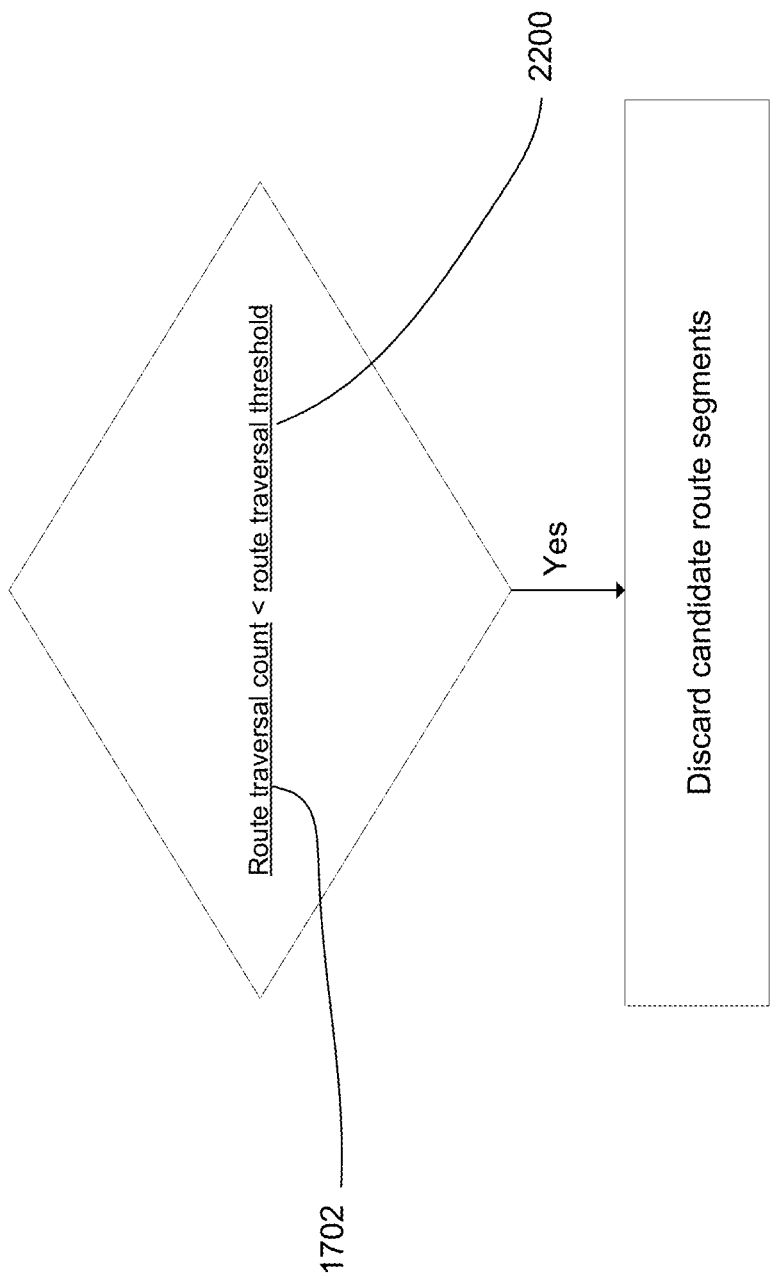
FIG. 22 illustrates a calculation for discarding a candidate route segment when a route traversal count is less than a route traversal threshold.

FIG. 22 illustrates a calculation for discarding a candidate route segment 2100 when a route traversal count 1702 is less than a route traversal threshold 2200. The system can calculate a route traversal count 1702 using additional check-in data 300 received from the device 102. The system can discard one or more of the candidate route segments 2100 making up the global minimum-cost route 2110 when the route traversal count 1702 is below a route traversal threshold 2200. The system can connect remaining instances of the candidate route segments 2100 making up the global minimum-cost route 2110 to determine the candidate safe route 1604.

Another method to compute safe routes 1606 is a vector quantization algorithm. In this method we can form training vectors of check-in data 300 that are between a starting zone 1502 and a destination zone 1504. The training vectors can be clustered using a centroid calculation. The resulting centroid vector route can be compared to possible routes from a map database 2112. The comparison can use a Euclidean distance measure or a squared distance measure. The minimum distance route can be selected as a candidate safe route 1604.

Figure 19:
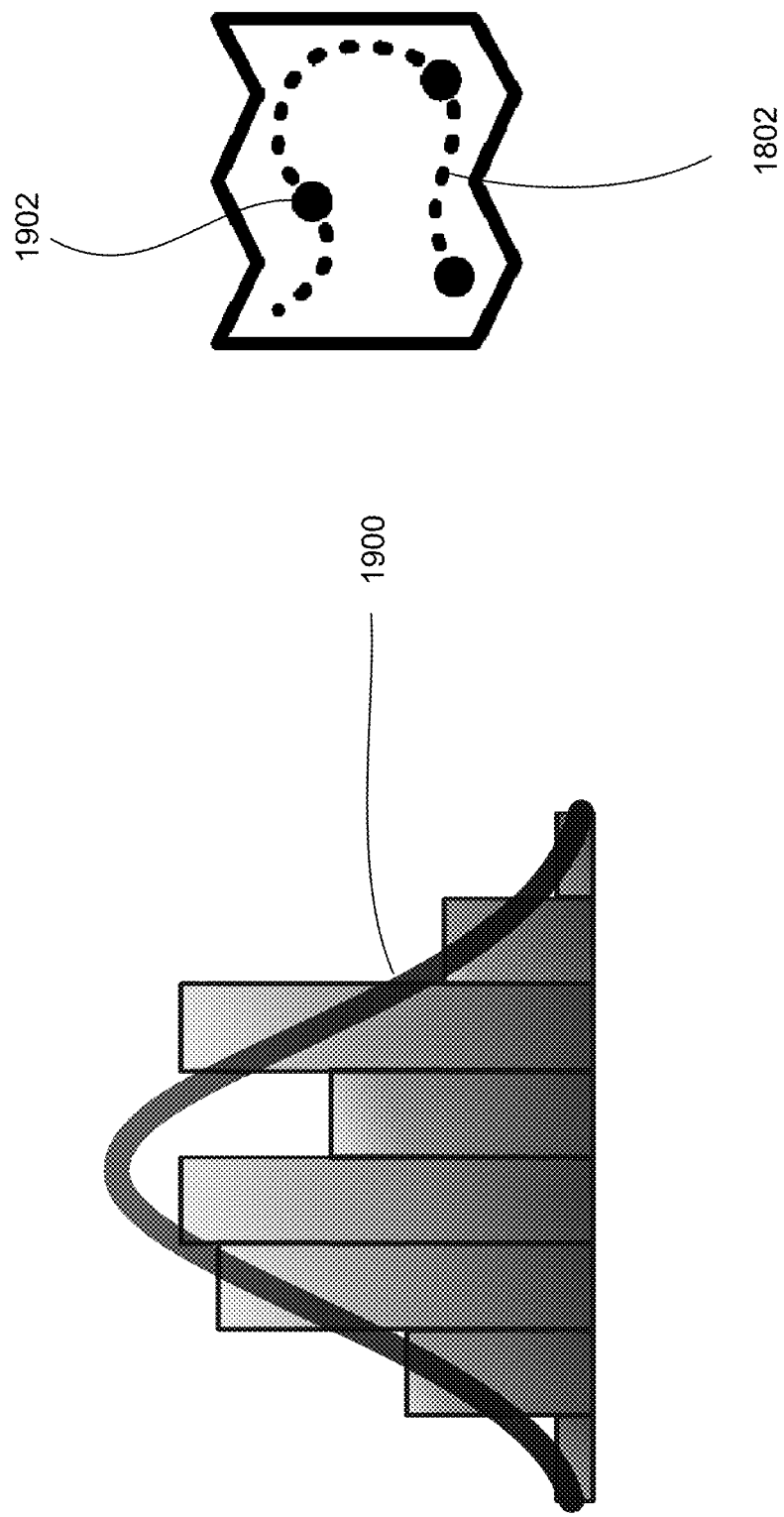
FIG. 19 illustrates the determination of a waypoint along an accepted safe route using a distribution of dwell times.

FIG. 19 illustrates the determination of a waypoint 1902 along an accepted safe route 1802 using a distribution of dwell times 1900. One method to calculate waypoints 1902 along the route using the raw data is to detect unusually long time differences between consecutive points, including multiple points that are close to each other. One method to determine waypoints 1902 in the safe route 1606 is to calculate the distribution of dwell times 1900 along the road segment. Peaks in the distribution may indicate possible waypoints 1902 along the route.

Figure 20:
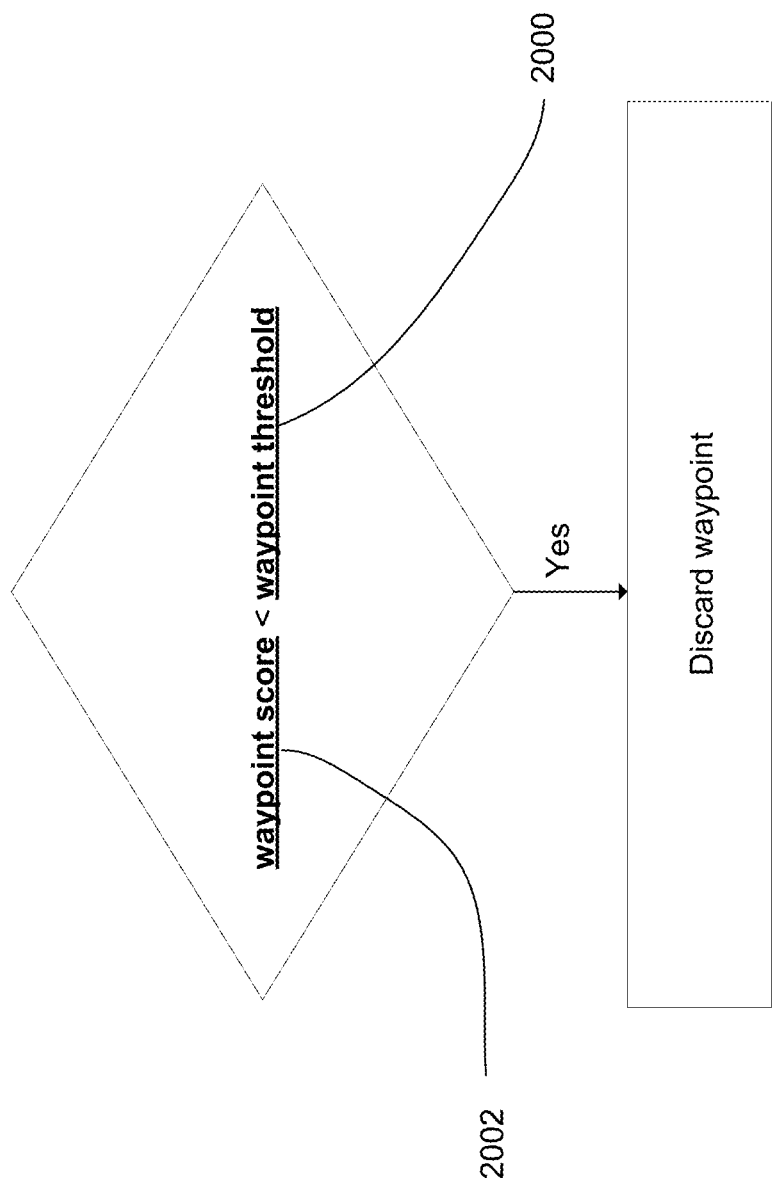
FIG. 20 illustrates a calculation for discarding a waypoint when a waypoint score falls below a waypoint threshold.

FIG. 20 illustrates a calculation for discarding a waypoint 1902 when a waypoint score 2002 falls below a waypoint threshold 2000. Waypoints 1902 can be assigned a waypoint score 2002. Waypoint scores 2002 can be increased when there are regular time domain patterns 1100. Examples of regular time domain patterns 1100 are time of day, day of week, and day of month. Waypoint scores 2002 can be increased when there are fresh data that are in agreement with previous determinations. Waypoint scores 2002 can be increased when an approval request 108 is approved by the device user. Waypoint scores 2002 can be increased when there is correlation with other known information. Other known information can include locations of popular stores and shopping malls. Waypoint scores 2002 can be increased when there is correlation with safe routes 1606 from related users.

Waypoint scores 2002 can be decreased when there is a lack of regular time domain patterns 1100. Waypoint scores 2002 can be decreased when new data deviates from past patterns. If repeated deviations exhibit some regularity, then new patterns can be established. Waypoint scores 2002 can be decreased when the age of the location data is above a certain threshold so that more weight is given to recent data. Waypoint scores 2002 can be decreased when there are high accident rates 1700 in the traversed region. Waypoint scores 2002 can be decreased when there are high crime rates in the traversed region.

Figure 23:
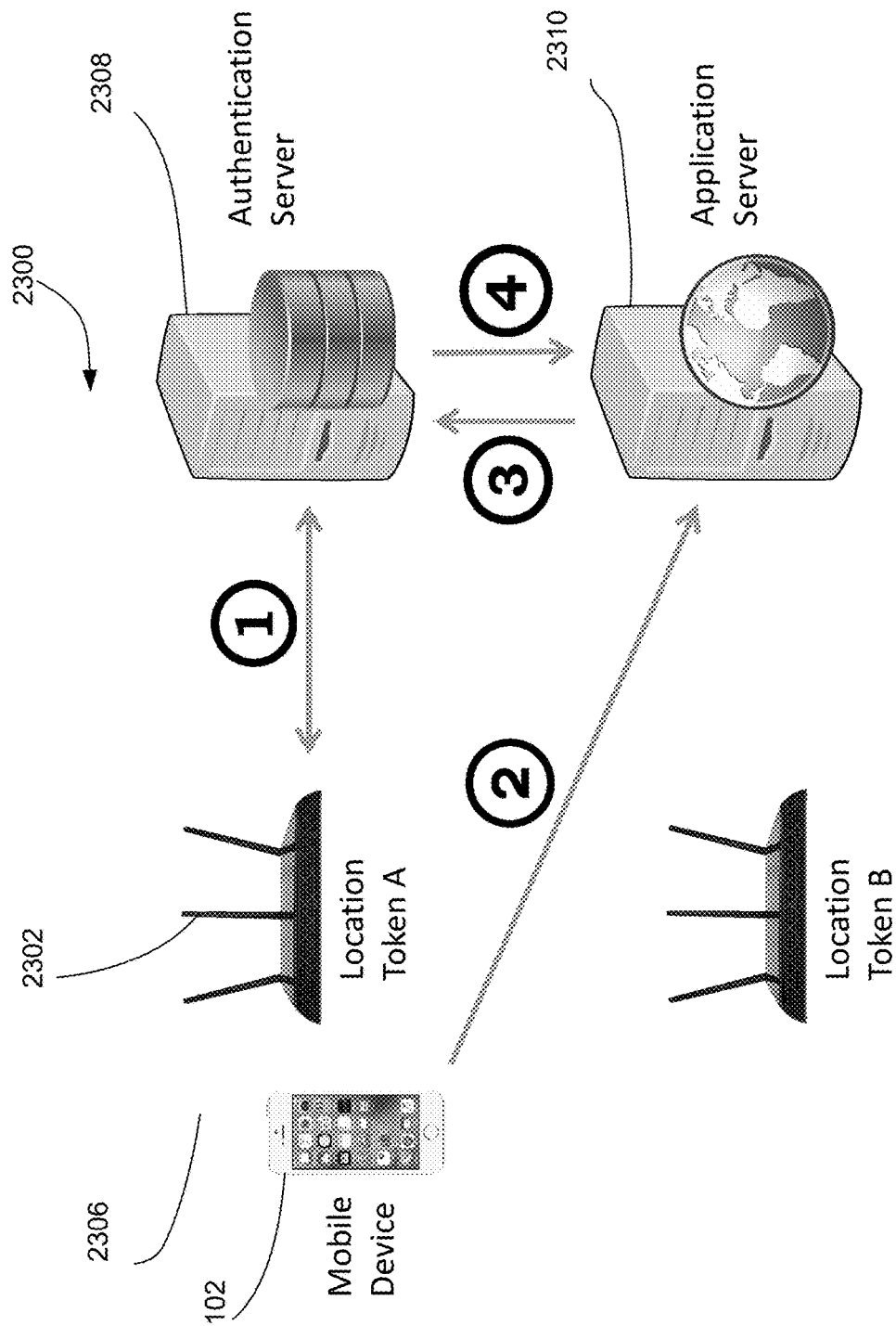
FIG. 23 illustrates a representation of a system for authenticating a device.

FIG. 23 illustrates a representation of a system 2300 for authenticating a device 102. The system 2300 can include a device 102, a fixed wireless infrastructure device 2302, a radio environment 2306, an authentication server 2308, and an application server 2310. An authentication server 2308 can periodically send an encrypted secure location token to a fixed wireless infrastructure device 2302. The fixed wireless infrastructure device 2302 can scan the radio environment and periodically report encrypted scan data to the authentication server 2308 to prevent the fixed wireless infrastructure device 2302 from being moved to a different location. A device 102 can send a service request and its received secure location token to an application server 2310, wherein the device 102 requests permission to accomplish a desired task or access a desired resource, which it is allowed to do when the device 102 is situated at its current location "A". The application server 2310 can send a request to the authentication server 2308 in order to confirm that the asserted location of the device 102 is in fact location "A". The authentication server 2308 can verify that the secure location token received from the device 102 via the application server 2310 is in fact from location "A". The authentication server 2308 can verify that the available location history of the device 102 corresponds to the device 102 travelling to and now occupying location "A".

Figure 24:
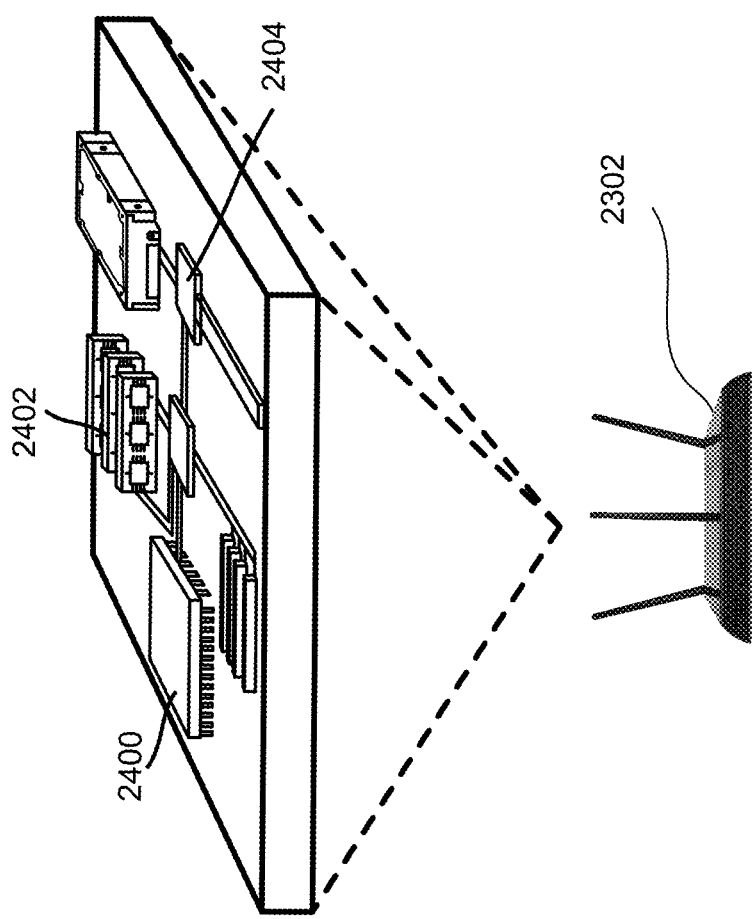
FIG. 24 illustrates some of the components of a fixed wireless infrastructure device.

FIG. 24 illustrates a representation of a fixed wireless infrastructure device 2302. The components can include a processor 2400, a memory 2402, and a communication unit.

Figure 25:
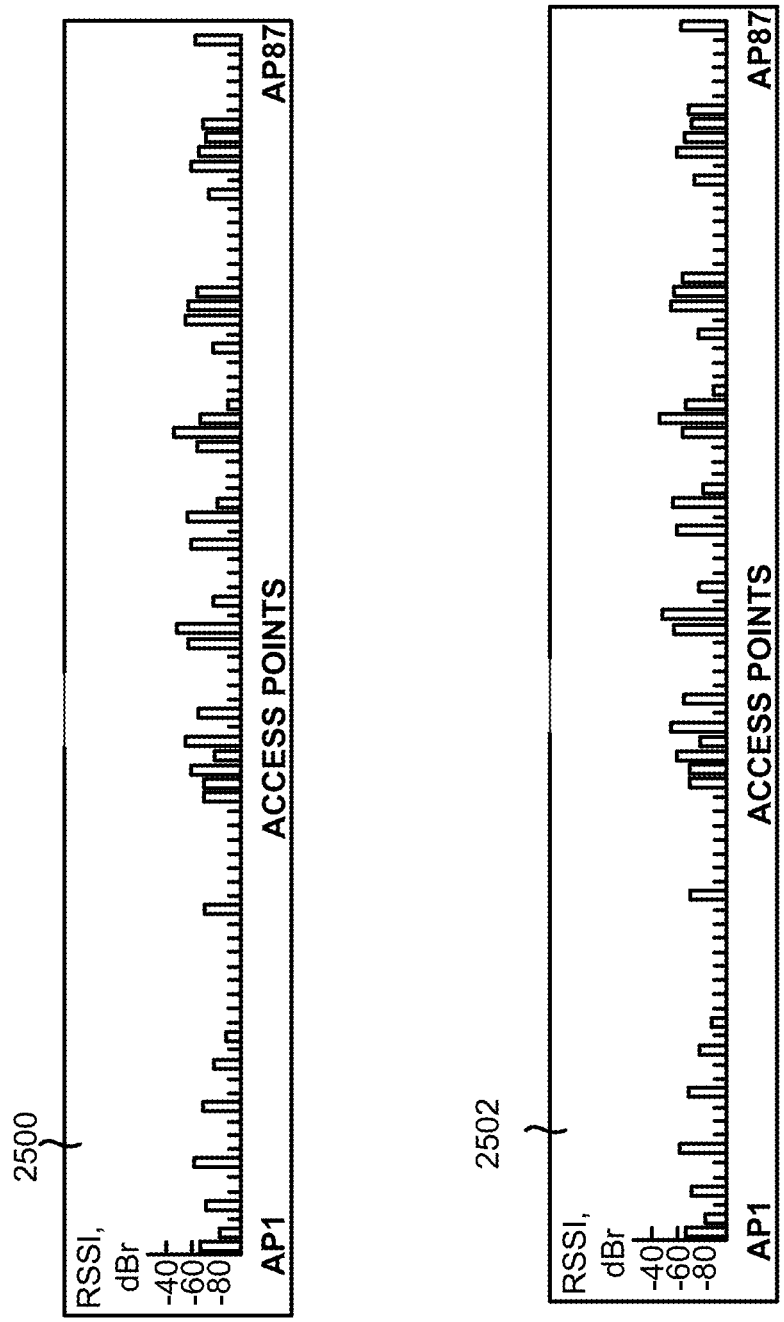
FIG. 25 illustrates a radio signal fingerprint.

FIG. 25 illustrates a radio signal fingerprint 2500 and a preapproved radio signal fingerprint 2502. The radio signal fingerprint 2500 can comprise a variety of measures, including GPS/GNSS output, Wi-Fi/Bluetooth (signal strength, time-of-flight, angle of arrival/departure, etc.), cell-ID and cellular signals, and RF signatures of the raw measurements. The authentication server 2308 can periodically send encrypted secure location tokens to a fixed wireless infrastructure device 2302. The fixed wireless infrastructure device 2302 can scan the radio environment and determine a radio signal fingerprint 2500. The fixed wireless infrastructure device 2302 can encrypt and periodically report the radio signal fingerprint 2500 to the authentication server 2308 to prevent the fixed wireless infrastructure device 2302 from being moved to a different location. The device 102 can send a service request and its received secure location token to an application server 2310 wherein the device 102 requests permission to accomplish a desired task or access a desired resource, which it is allowed to do when the device 102 is situated at location "A". The application server 2310 can send a request to the authentication server 2308 in order to confirm that the asserted location of the device 102 is in fact location "A". The authentication server 2308 can verify that the secure location token received from the device 102 via the application server 2310 is in fact from location "A", and further that the available location history of the device 102 corresponds to the device 102 travelling to and now occupying location "A".

Figure 26A:
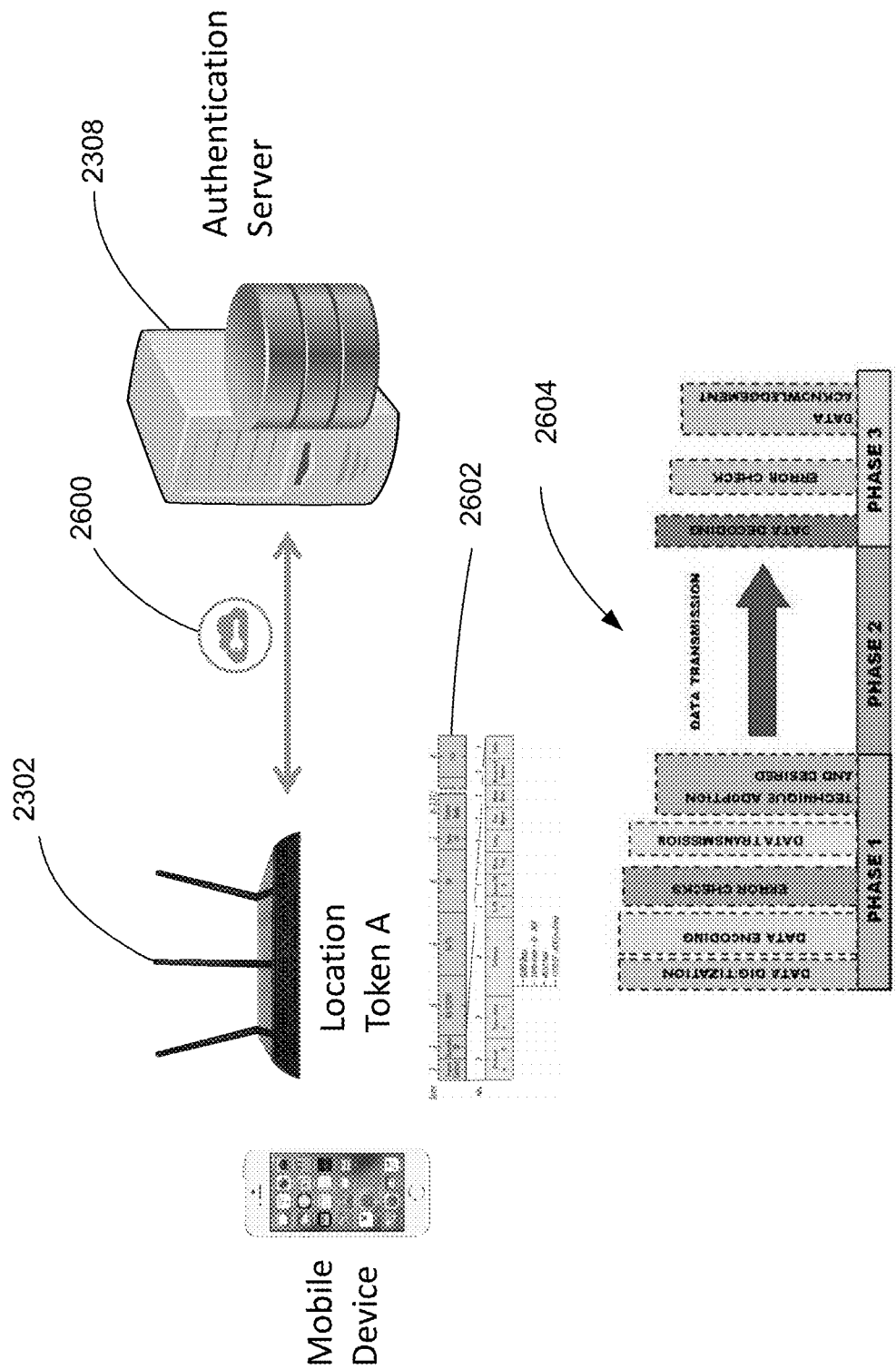
FIG. 26A illustrates authenticating a device using a security token.

FIG. 26A illustrates a system 2300 for authenticating a device 102 using a security token. The system 2300 can include a first cryptographic key 2600, a wireless broadcast frame 2602, and a wireless communication protocol 2604. The authentication server 2308 can transmit, periodically, a first cryptographic key 2600 to the fixed wireless infrastructure device 2302. The first cryptographic key 2600 can be included as part of a wireless broadcast frame 2602 of a wireless communication protocol 2604. The authentication server 2308 can receive from the fixed wireless infrastructure device 2302 the radio signal fingerprint 2500 to corroborate a geographic location 500 of the fixed wireless infrastructure device 2302. The processor 2400 of the fixed wireless infrastructure device 2302 can be further programmed to broadcast, via the communication unit 2404, the first cryptographic key 2600.

Figure 26B:
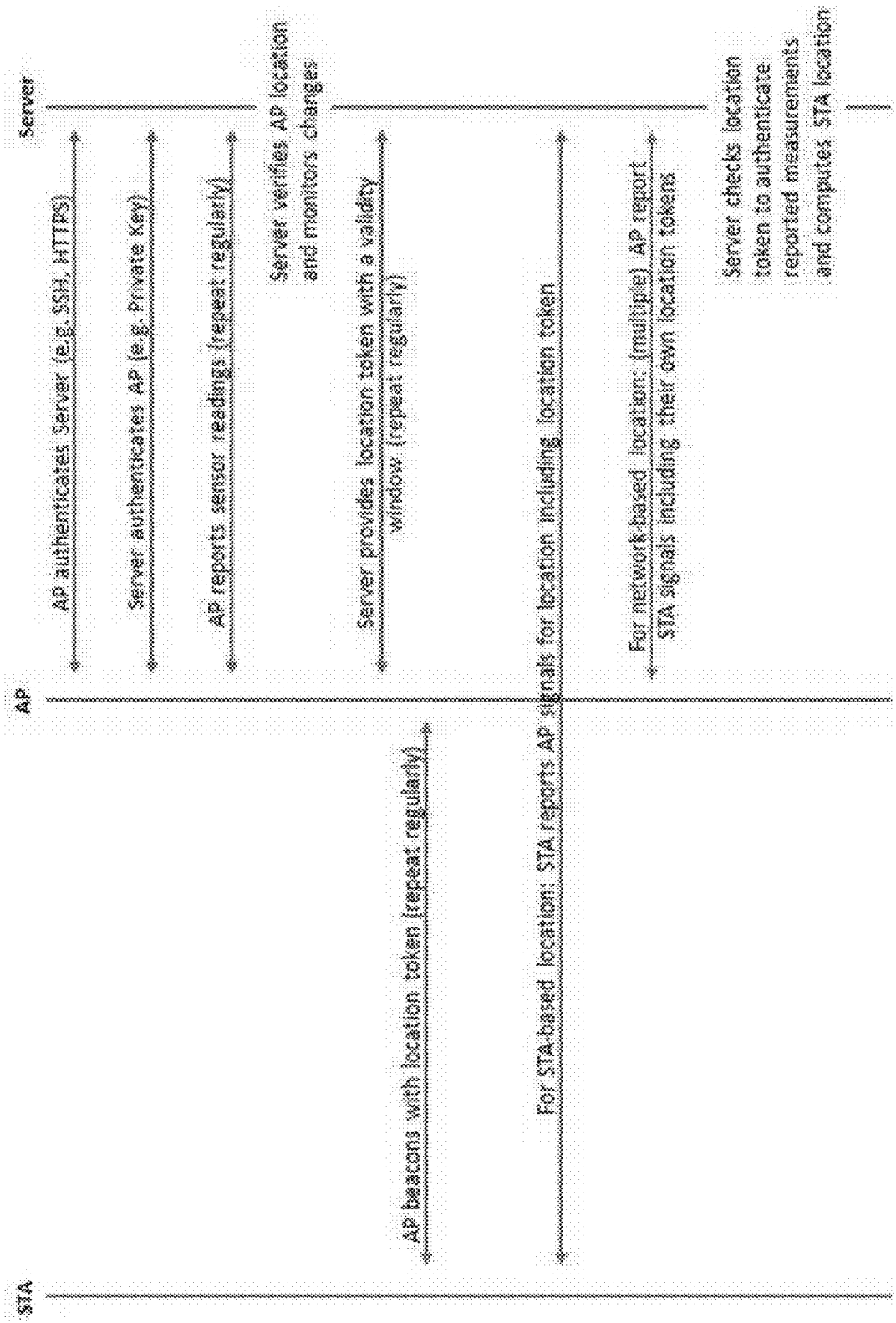
FIG. 26B illustrates authenticating a mobile station using a security token.

FIG. 26B illustrates a system for authenticating a mobile station using a security token. The system can establish a secure communications channel between a fixed wireless infrastructure device and an authentication server. The fixed wireless infrastructure device can send to the authentication server via the secure communications channel a message which includes at least one of a device identifier and an encrypted payload, the encrypted payload containing at least a time stamp, and wherein the fixed wireless infrastructure device encrypts the payload with a private key. The authentication server can authenticate the identity of the fixed wireless infrastructure device by cross-referencing in a database by device identifier to retrieve a public key, decrypting with the public key the message received from the fixed wireless infrastructure device, and confirming that the decrypted message is valid and that the time stamp is current. Once the identity of the fixed wireless infrastructure device has been authenticated, the fixed wireless infrastructure device can periodically scan its environment and report this data to the authentication server, the data to include Wi-Fi and optionally at least one of Bluetooth, GPS/GNSS, and barometric pressure. The authentication server can verify the location of the fixed wireless infrastructure device, maintain the data in a storage system for later retrieval, and monitor newly incoming scans for changes vis-à-vis the maintained data. The authentication server can periodically provide to the fixed wireless infrastructure device a security token with a corresponding token validity time window. The fixed wireless infrastructure device can include the security token in its beacon messages, using at least one of encoding the security token in a service set identifier and encoding the security token in a manufacturer specific data element. A mobile station can seek to be authenticated by the authentication server, whereby part of its authentication request includes reporting scans of its environment and the received security token. The authentication server can compare the scans to the maintained data from the fixed wireless infrastructure device and compare the security token to the security token and token validity time window provided to the fixed wireless infrastructure device, and grant the authentication request from the mobile station if the comparison match exceeds a configured threshold. A mobile station can seek to be authenticated by the authentication server, whereby part of its authentication request includes at least one of its service set identifier and a mobile station generated token which the mobile station will include in a broadcast manufacturer specific data element. The fixed wireless infrastructure device can receive the at least one of the mobile station service set identifier and mobile station generated token, and report to the authentication server this data in conjunction with the security token which the fixed wireless infrastructure device received from the authentication server. The authentication server can compare the at least one of the service set identifier and the mobile station generated token received from the mobile station to that received from the fixed wireless infrastructure device and compare the security token to the security token and token validity time window provided to the fixed wireless infrastructure device, and grant the authentication request from the mobile station if the comparison match exceeds a configured threshold.

Figure 27:
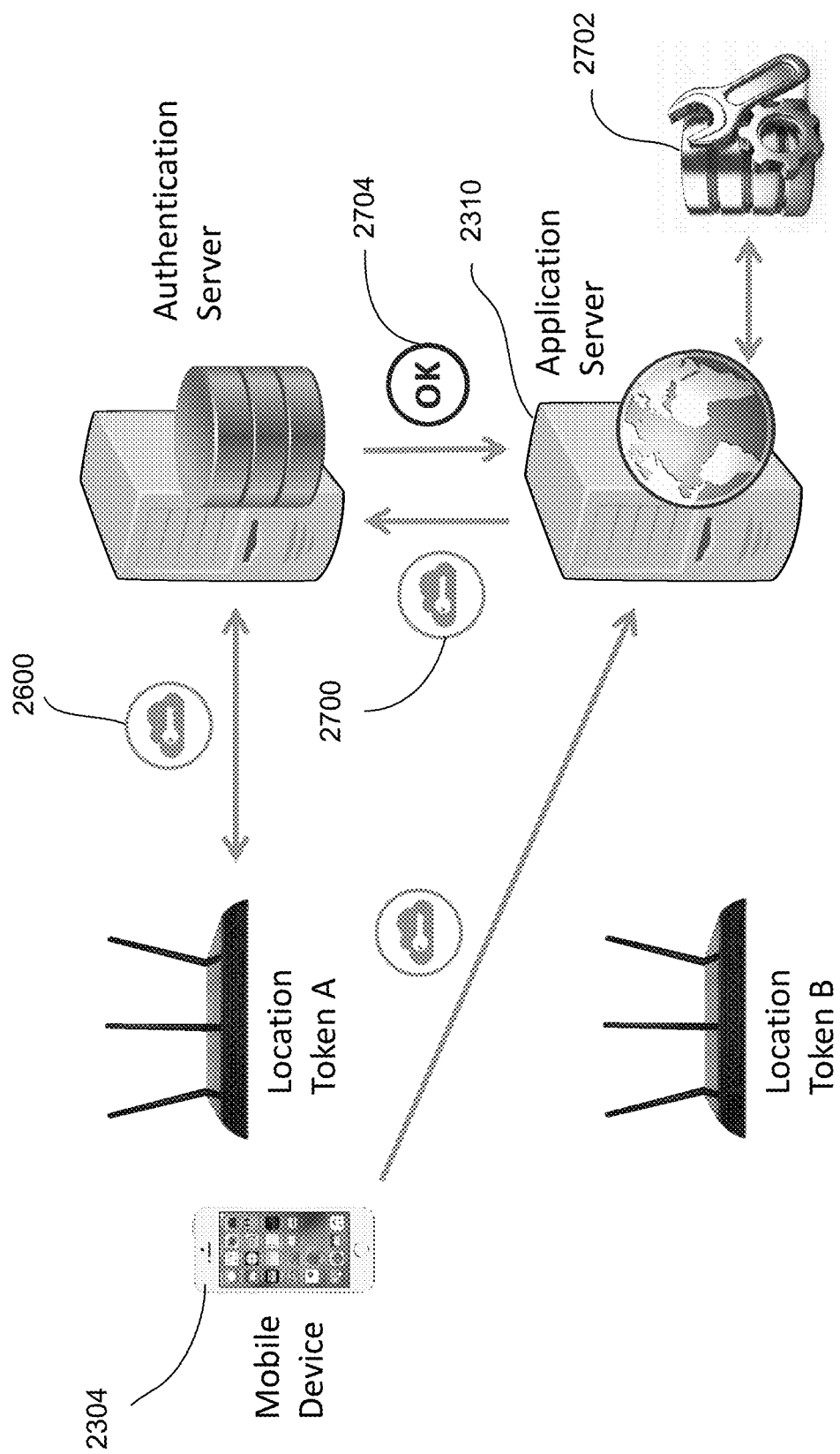
FIG. 27 illustrates system in which an authentication server generates a request approval recommendation.

FIG. 27 illustrates a system 2300 in which an authentication server 2308 generates a request approval recommendation 2704. The system includes a second geographic key 2700, a resource 2702, and a request approval recommendation 2704. The processing unit 200 of the authentication server 2308 can be programmed to receive a second cryptographic key 2700 from an application server 2310 originating from the device 102. The application server 2310 can be configured to receive the second cryptographic key 2700 as part of a request from the device 102 to access a resource 2702 provided by the application server 2310. The authentication server 2308 can generate a request approval recommendation 2704 to allow the device 102 access to the resource 2702 provided by the application server 2310 when the first cryptographic key 2600 matches the second cryptographic key 2700 and the radio signal fingerprint 2500 matches a preapproved radio fingerprint 2502.

Figure 28:
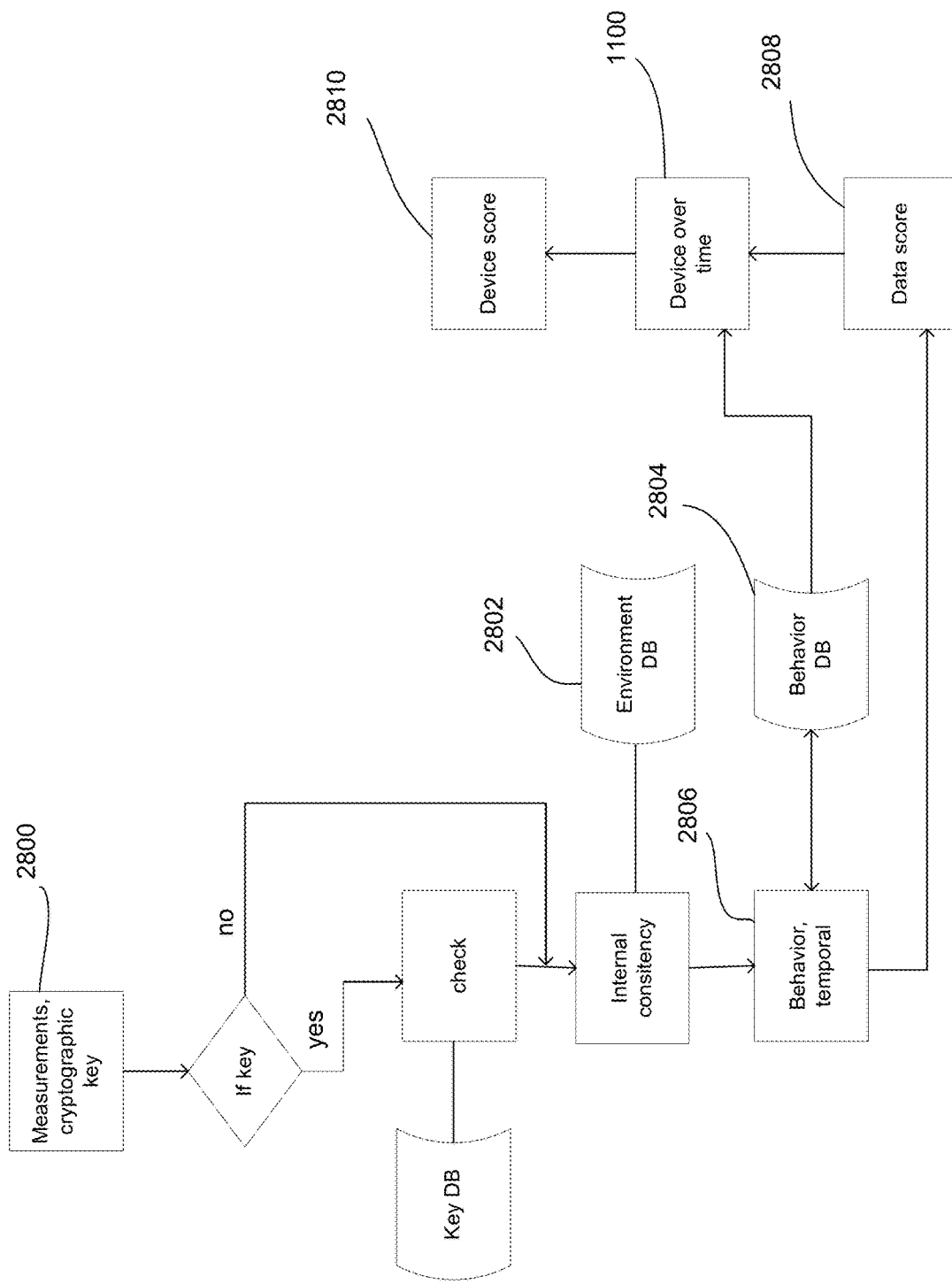
FIG. 28 illustrates the determination of data authenticity and device authenticity scores.

FIG. 28 illustrates a system 2300 for the determination of a data authenticity score 2808 and a device authenticity score 2810. The system can include location measurement data 2800, a location database 2802, historical travel records 2804, and travel pattern data 2806. Location data can be calculated from a variety of measurements. Location data can be calculated from GPS/GNSS output, Wi-Fi/Bluetooth devices, Cellular ID and cellular signals, RF signatures of raw measurements or any combination thereof. The measurement of Wi-Fi/Bluetooth devices can include signal strength, time-of-flight, angle of arrival/departure. A set of measurements taken together can form a location token which can be assigned a data authenticity score 2308. A location token can be accepted when the data authenticity score 2308 is above a certain threshold. The data authenticity score 2308 can be increased when the location token has similarity with past tokens. Examples of similarity with past tokens can include similar GPS location, similar Cellular ID, and Wi-Fi access points in the same vicinity. The data authenticity score 2308 can be increased when the location token has similarity in time-domain patterns. An example of similarity in time-domain patterns is a device 102 being near home at night-time every night. The data authenticity score 2308 can be increased when the location token has correlation with other known information. Examples of correlation with other known information can include known Cellular ID in the area, and a Starbucks-labelled access point near a known Starbucks location. The data authenticity score 2308 can be increased when the location token has co-location with other known devices. An example of co-location with other known devices is Bluetooth in a family car while moving at vehicular speed.

The data authenticity score 2308 can be decreased when the location token has lack of similarity with past tokens. The data authenticity score 2308 can be decreased when the location token has inconsistency with other known information. Inconsistency with other known information can include GPS location inconsistent with known Cellular ID, and GPS location inconsistent with GPS RF signatures.

Devices 102 presenting high authenticity tokens can get high device authenticity scores 2810. Devices 102 presenting low authenticity tokens can have their device authenticity scores 2810 decreased. The device authenticity score 2810 decrement can depend on the nature of the low authenticity token. Counter measures can be taken against devices 102 whose scores fall below a threshold. Examples of counter measures can include blacklisting, and temporary or permanent disabling.

Figure 29:
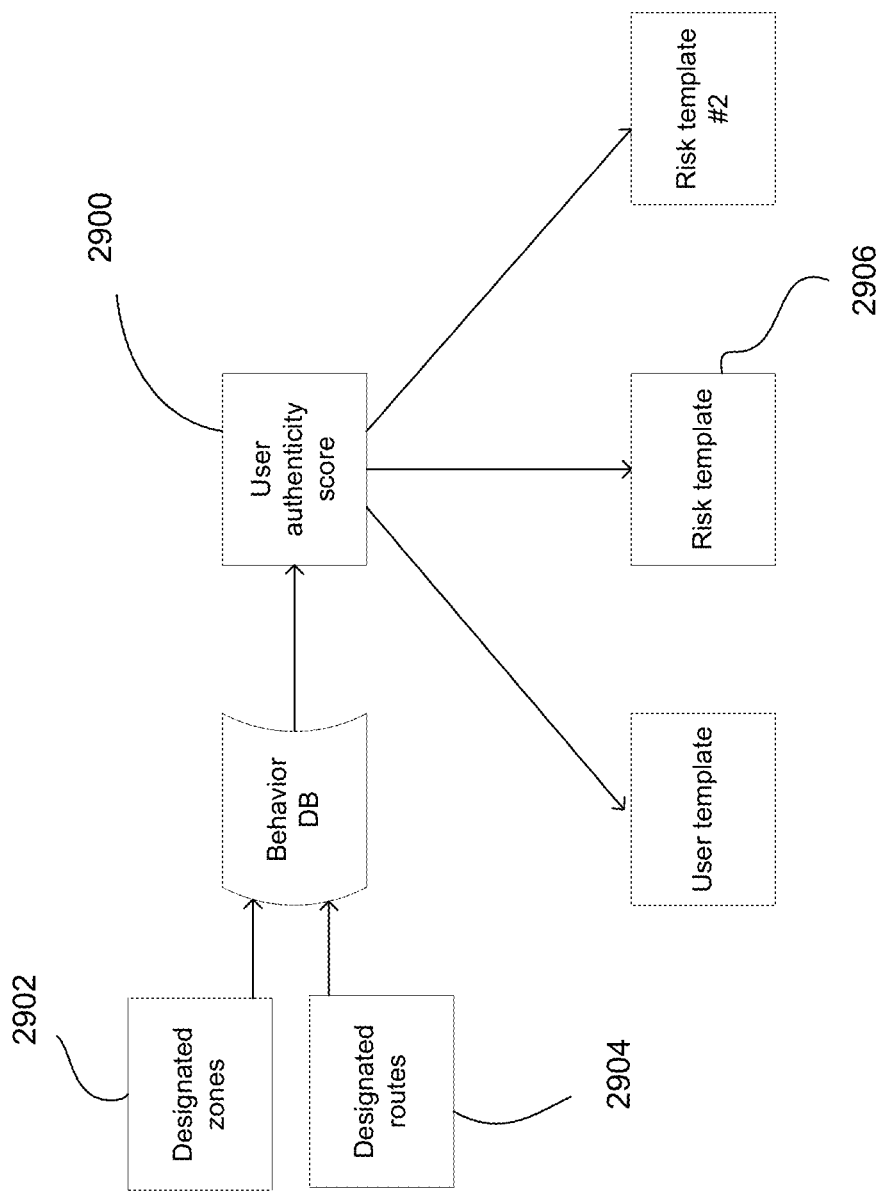
FIG. 29 illustrates the determination of a user authenticity score.

FIG. 29 illustrates a system for the determination of a user authenticity score 2900. The system can include a designated zone 2902, a designated route 2904, and a predetermined risk template 2906. The authenticity of the device 102 and location data can be used to calculate user authenticity scores 2900 which can be used for various authentication purposes. User authenticity scores 2900 can be used for on-demand authentication for in-person or online transactions. User authenticity scores 2900 can be used for continuous and non-conspicuous authentication of the user to the server. Multiple scores can be defined based on the location history on different time scales. Time scales can include day, week, month, or long-term. Short term scores, like day, can be important for transactions. Long-term scores can be more important for auto insurance and ride sharing. User authenticity scores 2900 can be derived from device authenticity scores 2810. High device authenticity scores 2810 can be a fundamental requirement of high user authenticity scores 2900. Low device authenticity scores 2810 can result in low user authenticity scores 2900. User authenticity scores 2900 can be derived from a history of association with pre-established safe zones 604 and safe routes 1606. Frequent and more recent association can increase user authenticity scores 2900. Lack of association can decrease the user authenticity score 2900. User authenticity scores 2900 can be influenced by the location of the device 102 at a particular time. Examples of this can include whether the device is with the user, left at a safe zone 604, at some random place, or cannot be located.

The systems, devices, methods, elements or combinations thereof disclosed in U.S. patent application Ser. No. 15/192,635, filed Jun. 24, 2016, U.S. patent application Ser. No. 15/256,351, filed Sep. 2, 2016, U.S. Pat. No. 9,210,544, filed Jun. 6, 2014, U.S. Pat. No. 9,258,674, filed Jul. 10, 2014, U.S. Pat. No. 9,367,215, filed Oct. 27, 2014, U.S. Pat. No. 9,414,189, filed Sep. 26, 2014, U.S. Pat. No. 8,315,389 filed Jan. 25, 2010, U.S. patent application Ser. No. 14/469,461, filed Aug. 26, 2014, U.S. patent application Ser. No. 14/938,691, filed Nov. 11, 2015, U.S. patent application Ser. No. 14/701,226, filed Apr. 30, 2015, and U.S. patent application Ser. No. 14/822,817, filed Oct. 10, 2015 can be used in combination with anything disclosed herein and are incorporated herein by reference in their entireties.

A number of embodiments have been described. Nevertheless, it will be understood by one of ordinary skill in the art that various modifications may be made without departing from the spirit and scope of the embodiments. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other embodiments are within the scope of the following claims.

It will be understood by one of ordinary skill in the art that the various methods disclosed herein may be embodied in a non-transitory readable medium, machine-readable medium, and/or a machine accessible medium comprising instructions compatible, readable, and/or executable by a processor or processing unit of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

We claim:

1. A system to authenticate a device, the system comprising:
a fixed wireless infrastructure device, wherein the fixed wireless infrastructure device comprises a processor, a memory, and a communication unit, and the processor is programmed to scan, periodically, using the communication unit, a radio environment surrounding the fixed wireless infrastructure device to obtain a radio signal fingerprint;
an authentication server comprising a processing unit, a memory unit, and a server communication unit, wherein the server communication unit is in communication with the fixed wireless infrastructure device, and the processing unit is programmed to:
transmit, periodically, a first cryptographic key to the fixed wireless infrastructure device, wherein the first cryptographic key is included as part of a wireless broadcast frame of a wireless communication protocol;
receive from the fixed wireless infrastructure device the radio signal fingerprint to corroborate a geographic location of the fixed wireless infrastructure device;
wherein the processor of the fixed wireless infrastructure device is further programmed to broadcast, via the communication unit, the first cryptographic key;
wherein the processing unit of the authentication server is further programmed to:
receive a second cryptographic key from an application server originating from the device, wherein the application server is configured to receive the second cryptographic key as part of a request from the device to access a resource provided by the application server; and
generate a request approval recommendation to allow the device access to the resource provided by the application server when the first cryptographic key matches the second cryptographic key and the radio signal fingerprint matches a preapproved radio signal fingerprint.

2. The system of claim 1, wherein the wireless communication protocol is at least one of an IEEE.11 protocol, a Bluetooth™ protocol, and an iBeacon™ protocol.

3. The system of claim 2, wherein the wireless broadcast frame is at least one of a WiFi broadcast frame, a Bluetooth™ broadcast frame, and an iBeacon™ broadcast frame.

4. The system of claim 1, wherein the processing unit of the authentication server is further programmed to:
evaluate a location measurement data received from the device by comparing the location measurement data against pre-approved data stored in a location database accessible to the authentication server, wherein the location measurement data includes at least one of GPS data, GNSS data, radio signal strength data, and device identification data collected or generated by the device;
evaluate travel pattern data received from the device by comparing the travel pattern data with historical travel records associated with the device; and
determine a data authenticity score based on the evaluation of the location measurement data and the travel pattern data.

5. The system of claim 4, wherein the processing unit of the authentication server is further programmed to determine a device authenticity score using a change in the data authenticity score over time and time-domain patterns associated with the device.

6. The system of claim 5, wherein the processing unit of the authentication server is further programmed to:
evaluate dwell times of the device in designated zones;
evaluate travel frequency of the device using designated routes;
determine a user authenticity score in connection with a user of the device using the device authenticity score, the evaluation of the dwell times in designated zones and travel frequency using the designated routes.

7. The system of claim 1, wherein the processing unit of the authentication server is further programmed to grant permission to a resource provided by an application server in communication with the authentication server based on a comparison of the user authenticity score and a predetermined risk template.

8. A computer-implemented method to authenticate a device, the method comprising:
    scanning, periodically, using a communication unit of a fixed wireless infrastructure device a radio environment surrounding the fixed wireless infrastructure device to obtain a radio signal fingerprint;
    transmitting, periodically, a first cryptographic key to the fixed wireless infrastructure device from an authentication server comprising a processing unit, wherein the first cryptographic key is included as part of a wireless broadcast frame of a wireless communication protocol;
    receiving, at the authentication server, the radio signal fingerprint from the fixed wireless infrastructure device to corroborate a geographic location of the fixed wireless infrastructure device;
    transmitting, using the communication unit of the fixed wireless infrastructure device, the first cryptographic key to the device when the device is within the radio environment and unconnected to a wireless network established by the fixed wireless infrastructure device;
    receiving, at the authentication server, a second cryptographic key from an application server originating from the device, wherein the application server is configured to receive the second cryptographic key as part of a request from the device to access a resource provided by the application server; and
    generate, at the authentication server, a request approval recommendation to allow the device access to the resource provided by the application server when the first cryptographic key matches the second cryptographic key and the radio signal fingerprint matches a preapproved radio fingerprint.

9. The computer-implemented method of claim 8, wherein the wireless communication protocol is at least one of an IEEE.11 protocol, a Bluetooth™ protocol, and an iBeacon™ protocol.

10. The computer-implemented method of claim 9, wherein the wireless broadcast frame is at least one of a WiFi broadcast frame, a Bluetooth™ broadcast frame, and an iBeacon™ broadcast frame.

11. The computer-implemented method of claim 8, further comprising:
    evaluating, using the processing unit of the authentication server, a location measurement data received from the device by comparing the location measurement data against pre-approved data stored in a location database accessible to the authentication server, wherein the location measurement data includes at least one of GPS data, GNSS data, radio signal strength data, and device identification data collected or generated by the device;
    evaluating, using the processing unit of the authentication server, travel pattern data received from the device by comparing the travel pattern data with historical travel records associated with the device; and
    determining, using the processing unit of the authentication server, a data authenticity score based on the evaluation of the location measurement data and the travel pattern data.

12. The computer-implemented method of claim 11, further comprising determining, using the processing unit of the authentication server, a device authenticity score using a change in the data authenticity score over time and time-domain patterns associated with the device.

13. The computer-implemented method of claim 12, further comprising:
    evaluating, using the processing unit of the authentication server, dwell times of the device in designated zones;
    evaluating, using the processing unit of the authentication server, travel frequency of the device using designated routes; and
    determining, using the processing unit of the authentication server, a user authenticity score in connection with a user of the device using the device authenticity score, the evaluation of the dwell times in designated zones and travel frequency using the designated routes.

14. The computer-implemented method of claim 8, further comprising granting, using the processing unit of the authentication server, permission to a resource provided by an application server in communication with the authentication server based on a comparison of the user authenticity score and a predetermined risk template.

15. A non-transitory computer-readable medium comprising instructions stored thereon, that when executed by a processing unit, perform the steps of:
    transmitting, periodically, a first cryptographic key to a fixed wireless infrastructure device, wherein the first cryptographic key is included as part of a wireless broadcast frame of a wireless communication protocol;
    receiving a radio signal fingerprint from the fixed wireless infrastructure device to corroborate a geographic location of the fixed wireless infrastructure device, wherein the fixed wireless infrastructure device periodically scans a radio environment surrounding the fixed wireless infrastructure device to obtain the radio signal fingerprint;
    receiving a second cryptographic key from an application server originating from a device, wherein the application server is configured to receive the second cryptographic key as part of a request from the device to access a resource provided by the application server, and wherein the device received the first cryptographic key from the fixed wireless infrastructure device when the device was within the radio environment established by the fixed wireless infrastructure device; and
    generating a request approval recommendation to allow the device access to the resource provided by the application server when the first cryptographic key matches the second cryptographic key and the radio signal fingerprint matches a preapproved radio fingerprint.

16. The non-transitory computer-readable medium of claim 15, further comprising instructions stored thereon, that when executed by the processing unit, perform the steps of:
    evaluating a location measurement data received from the device by comparing the location measurement data against pre-approved data stored in a location database accessible to the authentication server, wherein the location measurement data includes at least one of GPS data, GNSS data, radio signal strength data, and device identification data collected or generated by the device;
    evaluating travel pattern data received from the device by comparing the travel pattern data with historical travel records associated with the device; and
    determining a data authenticity score based on the evaluation of the location measurement data and the travel pattern data.

17. The non-transitory computer-readable medium of claim 16, further comprising instructions stored thereon, that when executed by the processing unit of the authentication server, perform the step of determining, a device authenticity score using a change in the data authenticity score over time and time-domain patterns associated with the device.

18. The non-transitory computer-readable medium of claim 17, further comprising instructions stored thereon, that when executed by the processing unit, perform the steps of:
evaluating dwell times of the device in designated zones;
evaluating travel frequency of the device using designated routes; and
determining a user authenticity score in connection with a user of the device using the device authenticity score, the evaluation of the dwell times in designated zones and travel frequency using the designated routes.

* * * * *